(12) United States Patent
Murakami et al.

(10) Patent No.: US 9,799,354 B2
(45) Date of Patent: Oct. 24, 2017

(54) MAGNETIC RECORDING HEAD AND MAGNETIC RECORDING AND REPRODUCING DEVICE

(71) Applicant: Kabushiki Kaisha Toshiba, Tokyo (JP)

(72) Inventors: Shuichi Murakami, Tokyo (JP); Kenichiro Yamada, Tokyo (JP); Katsuhiko Koui, Kanagawa (JP); Mariko Shimizu, Kanagawa (JP); Akihiko Takeo, Tokyo (JP); Naoyuki Narita, Kanagawa (JP); Hitoshi Iwasaki, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 15/262,081

(22) Filed: Sep. 12, 2016

(65) Prior Publication Data
US 2017/0236537 A1   Aug. 17, 2017

(30) Foreign Application Priority Data
Feb. 16, 2016  (JP) .................................. 2016-027334

(51) Int. Cl.
*G11B 5/31*   (2006.01)
*G11B 5/127*  (2006.01)
*G11B 5/00*   (2006.01)

(52) U.S. Cl.
CPC ............ *G11B 5/315* (2013.01); *G11B 5/1278* (2013.01); *G11B 2005/0024* (2013.01)

(58) Field of Classification Search
None
See application file for complete search history.

(56) References Cited

U.S. PATENT DOCUMENTS

| 8,081,397 | B2 | 12/2011 | Funayama et al. |
| 8,238,058 | B2 | 8/2012 | Shimizu et al. |
| 8,724,260 | B2 * | 5/2014 | Igarashi ................ G11B 5/314 360/119.03 |

(Continued)

FOREIGN PATENT DOCUMENTS

| JP | 2010-3353 | 1/2010 |
| JP | 2010-40080 | 2/2010 |

(Continued)

*Primary Examiner* — Will J Klimowicz
(74) *Attorney, Agent, or Firm* — Finnegan, Henderson, Farabow, Garrett & Dunner LLP

(57) ABSTRACT

According to one embodiment, a magnetic recording head includes a magnetic pole, a stacked body, and a first nonmagnetic layer. The stacked body includes first magnetic layer, a second magnetic layer provided between the first magnetic layer and the magnetic pole, and an intermediate layer provided between the first magnetic layer and the second magnetic layer and being nonmagnetic. The first nonmagnetic layer is provided between the second magnetic layer and the magnetic pole. A product of a thickness and a saturation magnetic flux density of the second magnetic layer is larger than a product of a thickness and a saturation magnetic flux density of the first magnetic layer. The length of the first magnetic layer is shorter than a length of the second magnetic layer. A current flows from the second magnetic layer toward the first magnetic layer.

20 Claims, 20 Drawing Sheets

(56) References Cited

U.S. PATENT DOCUMENTS

| | | | |
|---|---|---|---|
| 8,730,616 B2 * | 5/2014 | Yamada | G11B 5/1278 360/125.3 |
| 9,001,465 B1 * | 4/2015 | Shimizu | G11B 5/53 360/125.3 |
| 9,202,484 B1 * | 12/2015 | Watanabe | G11B 5/314 |
| 9,230,569 B1 * | 1/2016 | Shimoto | G11B 5/314 |
| 9,356,557 B1 * | 5/2016 | Gao | H03L 3/00 |
| 2010/0027158 A1 | 2/2010 | Takagishi et al. | |
| 2011/0205655 A1 * | 8/2011 | Shimizu | G11B 5/02 360/39 |
| 2013/0250456 A1 * | 9/2013 | Yamada | G11B 5/1278 360/245.3 |
| 2014/0036387 A1 * | 2/2014 | Sato | G11B 5/17 360/78.04 |
| 2017/0186450 A1 * | 6/2017 | Yamada | G11B 5/17 |

FOREIGN PATENT DOCUMENTS

| | | |
|---|---|---|
| JP | 2010-040126 | 2/2010 |
| JP | 2017-117502 | 6/2017 |

* cited by examiner

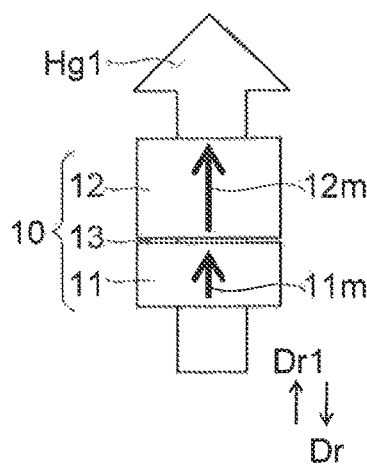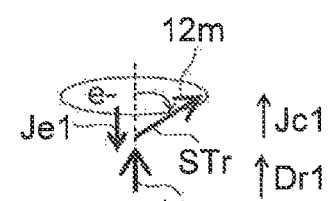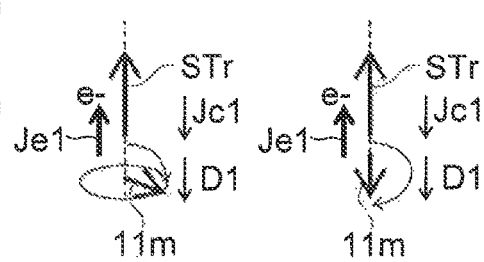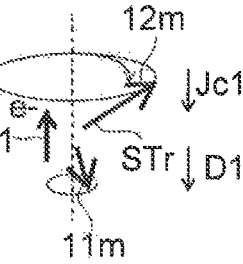
FIG. 4A   FIG. 4B   FIG. 4C   FIG. 4D   FIG. 4E

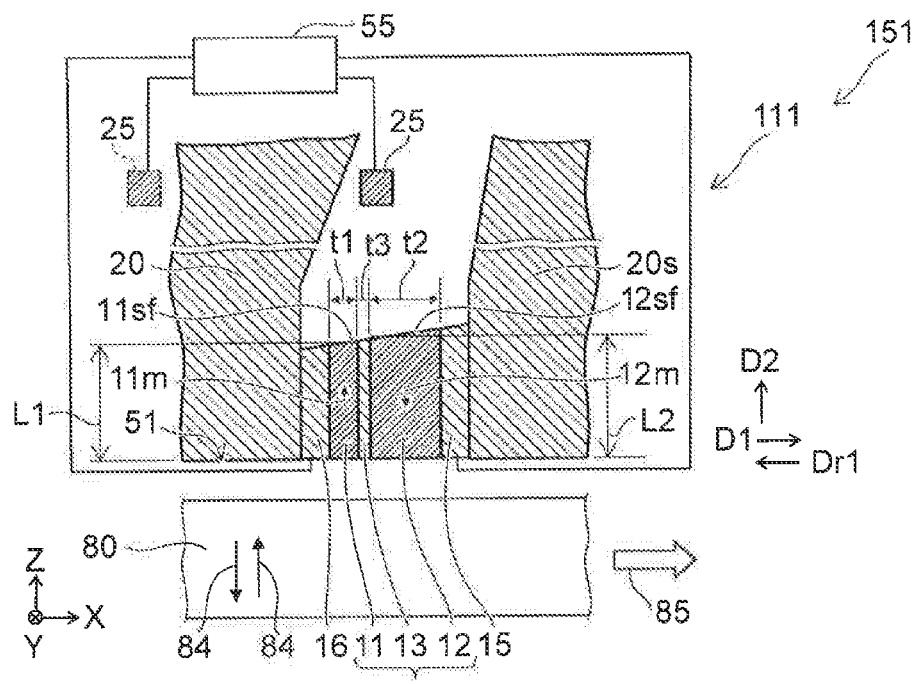
FIG. 11A
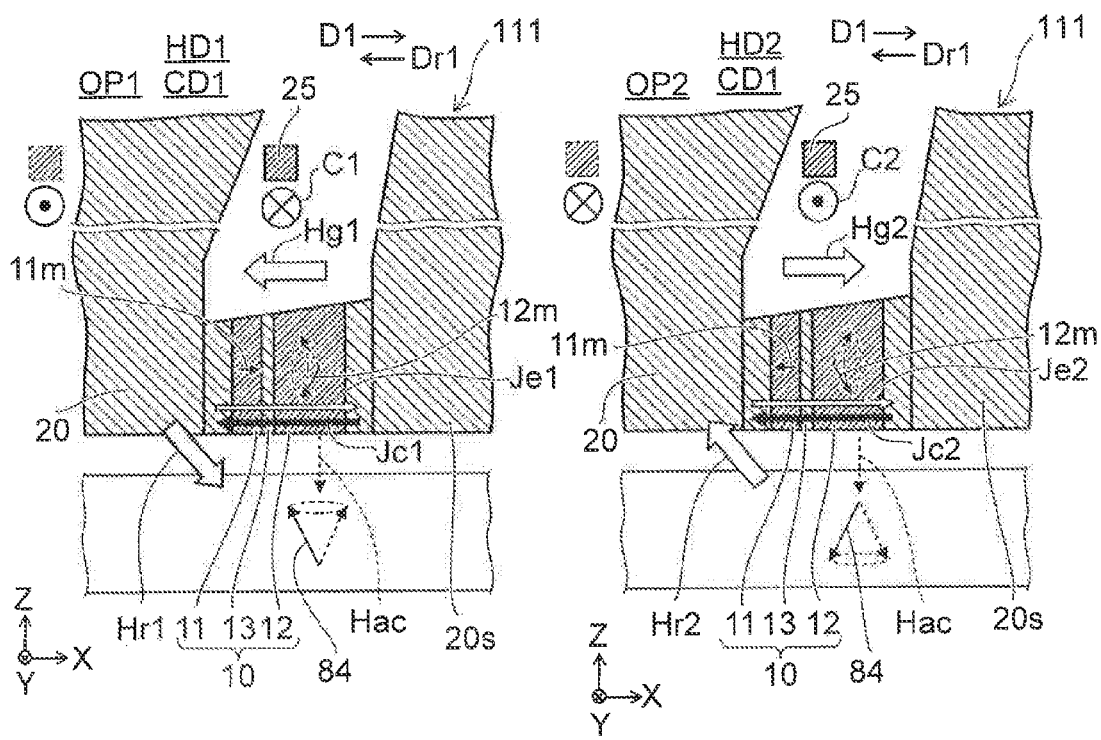
FIG. 11B
FIG. 11C

MAGNETIC RECORDING HEAD AND MAGNETIC RECORDING AND REPRODUCING DEVICE

CROSS-REFERENCE TO RELATED APPLICATIONS

This application is based upon and claims the benefit of priority from Japanese Patent Application No. 2016-027334, filed on Feb. 16, 2016; the entire contents of which are incorporated herein by reference.

FIELD

Embodiments described herein relate generally to a magnetic recording head and a magnetic recording and reproducing device.

BACKGROUND

Information is recorded in a magnetic storage medium such as a HDD (Hard Disk Drive), etc., using a magnetic recording head. It is desirable to increase the recording density of the magnetic recording head and the magnetic recording and reproducing device.

BRIEF DESCRIPTION OF THE DRAWINGS

FIG. 4A to FIG. 4E are schematic views illustrating operations of the magnetic recording head and the magnetic recording and reproducing device;

FIG. 11A to FIG. 11C are schematic cross-sectional views illustrating a magnetic recording head and a magnetic recording and reproducing device according to a second embodiment;

DETAILED DESCRIPTION

Figure 1A:
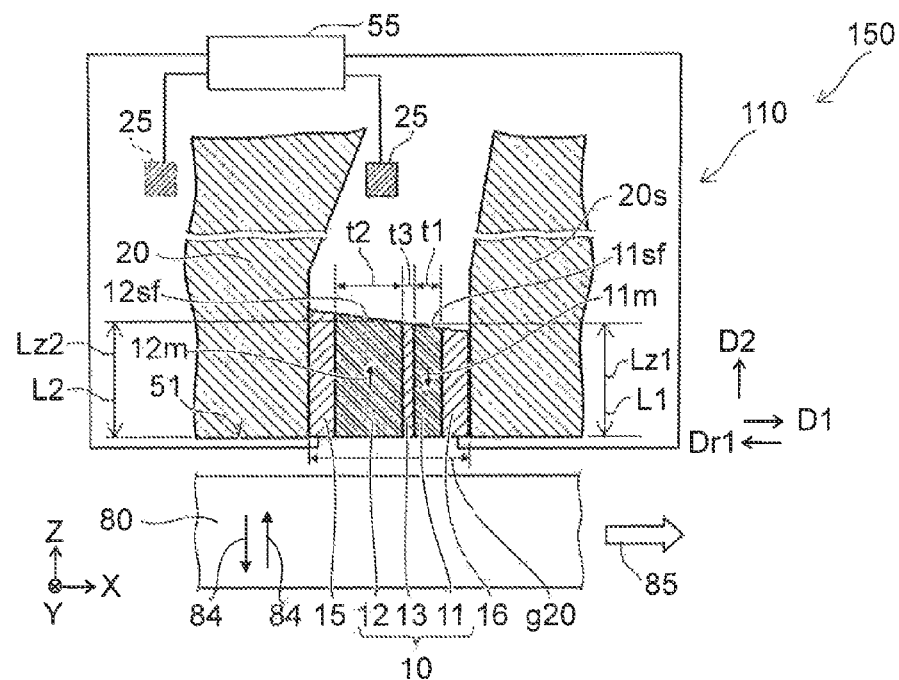
FIG. 1A to FIG. 1C are schematic cross-sectional views illustrating a magnetic recording head and a magnetic recording and reproducing device according to a first embodiment.

According to one embodiment, a magnetic recording head includes a magnetic pole, a stacked body, and a first nonmagnetic layer. The stacked body includes a first magnetic layer, a second magnetic layer provided between the first magnetic layer and the magnetic pole, and an intermediate layer provided between the first magnetic layer and the second magnetic layer and being nonmagnetic. The first nonmagnetic layer is provided between the second magnetic layer and the magnetic pole and contacting the magnetic pole and the second magnetic layer. The first magnetic layer has a first thickness and a first saturation magnetic flux density. The first thickness is along a first direction. The first direction is from the second magnetic layer toward the first magnetic layer. The second magnetic layer has a second thickness and a second saturation magnetic flux density. The second thickness is along the first direction. A second product of the second thickness and the second saturation magnetic flux density is larger than a first product of the first thickness and the first saturation magnetic flux density. A first length of the first magnetic layer in a second direction is shorter than a second length of the second magnetic layer in the second direction. The second direction is perpendicular to the first direction. A current flows from the second magnetic layer toward the first magnetic layer.

According to one embodiment, a magnetic recording head includes a magnetic pole, a shield, and a stacked body, and a first nonmagnetic layer. The stacked body includes a first magnetic layer provided between the magnetic pole and the shield, a second magnetic layer provided between the first magnetic layer and the shield, and an intermediate layer provided between the first magnetic layer and the second magnetic layer and being nonmagnetic. The first nonmagnetic layer is provided between the second magnetic layer and the shield and contacting the shield and the second magnetic layer. The first magnetic layer has a first thickness and a first saturation magnetic flux density. The first thickness is along a first direction. The first direction is from the second magnetic layer toward the first magnetic layer. The second magnetic layer has a second thickness and a second saturation magnetic flux density. The second thickness is along the first direction. A second product of the second thickness and the second saturation magnetic flux density is larger than a first product of the first thickness and the first saturation magnetic flux density. A first length of the first magnetic layer in a second direction is shorter than a second length of the second magnetic layer in the second direction. The second direction is perpendicular to the first direction. A current flows from the second magnetic layer toward the first magnetic layer.

According to one embodiment, a magnetic recording and reproducing device, includes the magnetic recording head described above, a magnetic recording medium, and a controller. Information is recorded on the magnetic recording medium by the magnetic head. The controller is configured to flow the current in the stacked body.

Various embodiments will be described hereinafter with reference to the accompanying drawings.

The drawings are schematic and conceptual; and the relationships between the thickness and width of portions, the proportions of sizes among portions, etc., are not necessarily the same as the actual values thereof. Further, the dimensions and proportions may be illustrated differently among drawings, even for identical portions.

In the specification and drawings, components similar to those described or illustrated in a drawing thereinabove are marked with like reference numerals, and a detailed description is omitted as appropriate.

First Embodiment

Figures 1B, 1C:
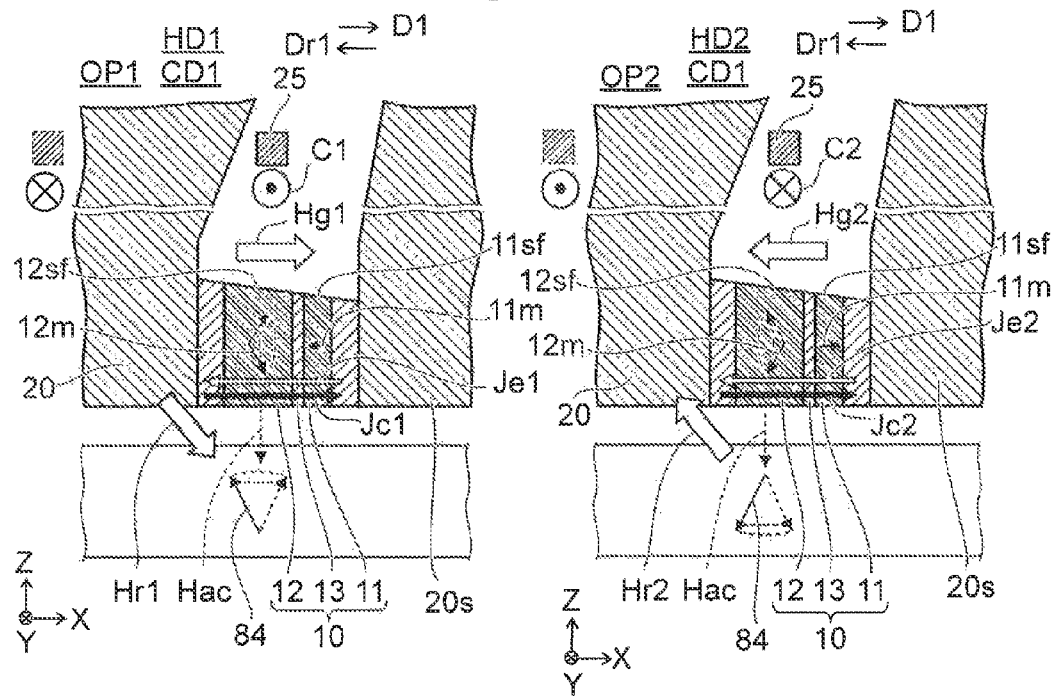

FIG. 1A to FIG. 1C are schematic cross-sectional views illustrating a magnetic recording head and a magnetic recording and reproducing device according to a first embodiment.

FIG. 1B and FIG. 1C illustrate states (operations) of the magnetic recording head and the magnetic recording and reproducing device.

As shown in FIG. 1A, the magnetic recording and reproducing device 150 according to the embodiment includes a magnetic recording medium 80 and the magnetic recording head 110 according to the embodiment. The magnetic recording head 110 records information in the magnetic recording medium 80.

The magnetic recording head 110 includes a magnetic pole 20, a stacked body 10, and a first nonmagnetic layer 15.

The magnetic pole 20 applies a magnetic field (a recording magnetic field) to the magnetic recording medium 80. The magnetic pole 20 is, for example, a major electrode.

The stacked body 10 includes a first magnetic layer 11, a second magnetic layer 12, and an intermediate layer 13. The second magnetic layer 12 is provided between the first magnetic layer 11 and the magnetic pole 20. The intermediate layer 13 is provided between the first magnetic layer 11 and the second magnetic layer 12. The intermediate layer 13 is nonmagnetic. As described below, the stacked body 10 generates a high frequency magnetic field. The high frequency magnetic field is applied to the magnetic recording medium 80. The recording of the information to the magnetic recording medium 80 by the magnetic pole 20 is assisted by the high frequency magnetic field. For example, high frequency assisted recording is performed in the magnetic recording head 110. For example, the stacked body 10 functions as a spin torque oscillator (STO).

The first nonmagnetic layer 15 is provided between the second magnetic layer 12 and the magnetic pole 20. The first nonmagnetic layer 15 contacts the magnetic pole 20 and the second magnetic layer 12. A magnetic layer is not provided between the magnetic pole 20 and the second magnetic layer 12. The first nonmagnetic layer 15 is, for example, a metal layer. The metal layer may include an alloy. The first nonmagnetic layer 15 may include multiple stacked films (metal films).

A shield 20s and a second nonmagnetic layer 16 are further provided in the example. The stacked body 10 is disposed between the magnetic pole 20 and the shield 20s. The first nonmagnetic layer 15 is disposed between the magnetic pole 20 and the stacked body 10. The second nonmagnetic layer 16 is provided between the shield 20s and the stacked body 10. In the example, the second nonmagnetic layer 16 is disposed between the first magnetic layer 11 and the shield 20s.

The second nonmagnetic layer 16 is, for example, a metal layer. The metal layer may include an alloy. The second nonmagnetic layer 16 may include multiple stacked films (metal films).

The magnetic recording head 110 opposes the magnetic recording medium 80. The magnetic pole 20 of the magnetic recording head 110 has a medium-opposing surface 51 (an Air Bearing Surface (ABS)). The magnetic recording medium 80 moves relative to the medium-opposing surface 51. A medium movement direction 85 of the magnetic recording medium 80 is substantially parallel to the medium-opposing surface 51. The recording magnetic field is applied from the magnetic pole 20 to each of different positions of the magnetic recording medium 80 according to the movement of the magnetic recording medium 80. The orientation of a magnetization 84 of the magnetic recording medium 80 is modified by the recording magnetic field.

The magnetic recording medium 80 is, for example, a perpendicular magnetization film. For example, the state in which the magnetization 84 is upward corresponds to the information of one of "1" or "0," For example, the state in which the magnetization 84 is downward corresponds to the information of the other of "1" or "0."

The shield 20s is, for example, a trailing shield. For example, one position of the magnetic recording medium 80 opposes the shield 20s after opposing the magnetic pole 20.

A coil 25 is provided in the magnetic recording head 110. The coil 25 causes a magnetic field to be generated from the magnetic pole 20. For example, the direction of the magnetic field (e.g., the recording magnetic field) generated by the magnetic pole 20 changes according to the direction of the current flowing in the coil 25. For example, the direction of the current flowing in the coil 25 corresponds to the information to be recorded.

A controller 55 is further provided in the example. The controller 55 is included in the magnetic recording and reproducing device 150. The controller 55 may be included in the magnetic recording head 110.

The controller 55 is electrically connected to the coil 25. For example, a current is supplied from the controller 55 to the coil 25. The direction of the current is controlled by the controller 55.

For example, the controller 55 is electrically connected to the first nonmagnetic layer 15 and the second nonmagnetic layer 16. As described below, a current flows in the stacked body 10. For example, the current is supplied by the controller 55. For example, the first nonmagnetic layer 15 and the second nonmagnetic layer 16 function as electrodes. The electrical connection between the controller 55 and the first nonmagnetic layer 15 may be performed via the magnetic pole 20. The electrical connection between the controller 55 and the second nonmagnetic layer 16 may be performed via the shield 20s.

The direction from the magnetic recording medium 80 toward the magnetic recording head 110 is taken as a Z-direction. One direction perpendicular to the Z-direction is taken as an X-direction. A direction perpendicular to the Z-direction and the X-direction is taken as a Y-direction. The Z-direction is the height direction. The X-direction is aligned with the down-track direction. The Y-direction is aligned with the track width direction.

In the magnetic recording head 110, the direction from the second magnetic layer 12 toward the first magnetic layer 11 is taken as a first direction D1. A direction from the first magnetic layer 11 toward the second magnetic layer 12 is taken as a first reverse direction Dr1. The first reverse direction Dr1 is antiparallel to the first direction D1. For example, the first direction D1 and the first reverse direction Dr1 are aligned with the X-direction. The first direction D1 and the first reverse direction Dr1 are aligned with the stacking direction of the stacked body 10. In the example, the X-direction is aligned with the stacking direction of the stacked body 10.

The first magnetic layer 11 has a first thickness t1 along the first direction D1. The second magnetic layer 12 has a second thickness t2 along the first direction D1. The intermediate layer 13 has a third thickness t3 along the first direction D1. For example, the thickness of the stacked body 10 is dependent on the total of, for example, the first thickness t1, the second thickness t2, and the third thickness t3.

For example, in the medium-opposing surface 51, the distance (the distance along the first direction D1) between the magnetic pole 20 and the shield 20s is taken as a gap length g20. The recording density can be increased by setting the gap length g20 to be small. The gap length g20 can be set to be small by setting the thickness of the stacked body 10 to be thin.

In the embodiment, the first thickness t1 of the first magnetic layer 11 is set to be relatively thin. Thereby, the thickness of the stacked body 10 can be thin; and the gap length g20 can be small.

The magnetic thickness of the magnetic film is defined. The magnetic thickness is the product of the thickness t of the magnetic film and the saturation magnetic flux density Bs of the magnetic film.

In the embodiment, the magnetic thickness of the second magnetic layer 12 is thicker than the magnetic thickness of the first magnetic layer 11. The first magnetic layer 11 has the first thickness t1 along the first direction D1, and a first saturation magnetic flux density Bs1. The second magnetic layer 12 has the second thickness t2 along the first direction D1, and a second saturation magnetic flux density Bs2. In the embodiment, a second product (t2·Bs2) of the second thickness t2 and the second saturation magnetic flux density Bs2 is larger than a first product (t1·Bs1) of the first thickness t1 and the first saturation magnetic flux density Bs1. For example, the second thickness t2 may be greater than the first thickness t1. The second thickness t2 may be 2 times the first thickness t1 or more.

In the embodiment as shown in FIG. 1A, the width of the first magnetic layer 11 is narrower than the width of the second magnetic layer 12. One direction perpendicular to the first direction D1 is taken as a second direction D2. In the example, the second direction D2 is aligned with the Z-direction. A first length L1 of the first magnetic layer 11 in the second direction D2 is shorter than a second length L2 of the second magnetic layer 12 in the second direction D2. In the example, the first length L1 is a length Lz1 in the Z-direction of the first magnetic layer 11. The second length L2 is a length Lz2 in the Z-direction of the second magnetic layer 12.

The first length L1 may be, for example, the length of the first magnetic layer 11 in the second direction D2 at the position of the center in the thickness direction (the first direction D1) of the first magnetic layer 11. The first length L1 may be, for example, the maximum value of the length of the first magnetic layer 11 in the second direction D2.

The second length L2 may be, for example, the length of the second magnetic layer 12 in the second direction D2 at the position of the center in the thickness direction (the first direction D1) of the second magnetic layer 12. The second length L2 may be, for example, the minimum value of the length of the second magnetic layer 12 in the second direction D2.

As shown in FIG. 1A, for example, the first length L1 may change along the first direction D1. For example, the second length L2 may change along the first direction D1. In such a case, for example, the maximum value of the length of the first magnetic layer 11 in the second direction D2 is less than the minimum value of the length of the second magnetic layer 12 in the second direction D2.

For example, the second length L2 is 1.05 times the first length L1 or more.

Further, in the embodiment, the current that flows in the stacked body 10 is used as a special condition. In other words, in the embodiment, a current flows from the second magnetic layer 12 toward the first magnetic layer 11. Operations according to the embodiment will now be described.

FIG. 1B illustrates a first operation OP1. The first operation OP1 corresponds to a first state of the magnetic recording head 110. In the first operation OP1, a first coil current C1 flows in the coil 25. The direction of the first coil current C1 in the region between the magnetic pole 20 and the shield 20s is, for example, the reverse of (antiparallel to) the Y-directio.

In the first operation OP1 (the first state), a first magnetic-pole magnetic field Hg1 that is generated from the magnetic pole 20 has a component along the first direction D1. At this time, a current Jc1 flows in the first direction D1 in the stacked body 10. At this time, an electron current Je1 is caused to flow. The direction of the electron current Je1 is the reverse of the orientation of the current Jc1. The current Jc1 is not less than the threshold current at which the stacked body 10 oscillates. At this time, a high frequency magnetic field Hac is generated by the stacked body 10. The high frequency magnetic field Hac is applied to the magnetic recording medium 80. The magnetization 84 of the magnetic recording medium 80 reverses easily due to the high frequency magnetic field Hac.

In the first operation OP1, a first recording magnetic field Hr1 is generated from the magnetic pole 20. The first recording magnetic field Hr1 is based on the first coil current C1. The first recording magnetic field Hr1 is applied to the magnetic recording medium 80. The magnetization 84 of the magnetic recording medium 80 is aligned with the direction of the first recording magnetic field Hr1. For example, the magnetization 84 reverses. For example, high frequency assisted recording is performed. Thereby, the recording of first information (e.g., the one of "1" or "0") is performed.

FIG. 1C illustrates a second operation OP2. The second operation OP2 corresponds to a second state of the magnetic recording head 110. In the second operation OP2, a second coil current C2 flows in the coil 25. The direction of the second coil current C2 in the region between the magnetic pole 20 and the shield 20s is, for example, the Y-direction.

In the second operation OP2 (the second state), a second magnetic-pole magnetic field Hg2 that is generated from the magnetic pole 20 has a component along the first reverse direction Dr1 (the reverse of, or antiparallel to, the first direction D1). At this time as well, the current Jc1 is caused to flow in the first direction D1 in the stacked body 10. The current Jc1 is not less than the threshold current at which the stacked body 10 oscillates. At this time, the high frequency magnetic field Hac is generated by the stacked body 10. The high frequency magnetic field Hac is applied to the magnetic recording medium 80. The magnetization 84 of the magnetic recording medium 80 reverses easily due to the high frequency magnetic field Hac.

In the second operation OP2, a second recording magnetic field Hr2 is generated from the magnetic pole 20. The second recording magnetic field Hr2 is based on the second coil current C2. The second recording magnetic field Hr2 is applied to the magnetic recording medium 80. The magnetization 84 of the magnetic recording medium 80 is aligned with the direction of the second recording magnetic field Hr2. For example, the magnetization 84 reverses. For example, high frequency assisted recording is performed. Thereby, the recording of second information (e.g., the other of "1" or "0") is performed.

In the embodiment as recited above, the first thickness t1 of the first magnetic layer 11 is set to be thin. Further, a current (the current Jc1) flows from the second magnetic layer 12 toward the first magnetic layer 11 in the stacked body 10. Thereby, it was found that the high frequency magnetic field Hac is generated from the stacked body 10.

In the embodiment, the gap length g20 is small due to the thin first magnetic layer 11. In this configuration, by causing the current in the direction recited above to flow in the stacked body 10, the high frequency magnetic field Hac is generated from the stacked body 10. For example, high frequency assisted recording is implemented by the high frequency magnetic field Hac. The high frequency assisted recording is possible even in the case where the gap length g20 is small.

According to the embodiment, due to the high frequency magnetic field Hac and the small gap length g20, a magnetic recording head and a magnetic recording and reproducing device can be provided in which the recording density can be increased.

Further, as described above, the width (the first length L1) of the first magnetic layer 11 is less than the width (the second length L2) of the second magnetic layer 12. Thereby, as described below, oscillation is obtained by a small current. Low-current driving is possible. Thereby, the appropriate operations are obtained even in the case where the stacked body 10 is small. Thereby, the recording density can be increased further. According to the embodiment, a magnetic recording head and a magnetic recording and reproducing device can be provided in which the recording density can be increased.

Examples of the operations of the stacked body 10 of the embodiment will now be described.

For example, FIG. 1A corresponds to the state (the initial state) in which a current is not supplied to the coil 25. In this state, the orientation of a magnetization 12m of the second magnetic layer 12 is the Z-direction. The second magnetic layer 12 is, for example, an in-plane magnetization film. At this time, the orientation of a magnetization 11m of the first magnetic layer 11 is the −Z direction (the reverse (antiparallel) direction of the Z-direction). The first magnetic layer 11 is, for example, an in-plane magnetization film. The orientation of the magnetization 11m of the first magnetic layer 11 changes easily. Thereby, the first state and the second state are generated.

In the first state (the first operation OP1) illustrated in FIG. 1B, spin is reflected at the interface between the second magnetic layer 12 and the intermediate layer 13 due to the electron current Jet in the first reverse direction Dr1. The reflected spin travels to the first magnetic layer 11. Reflected spin torque is injected from the second magnetic layer 12 toward the first magnetic layer 11. The magnetization 11m of the first magnetic layer 11 is the reverse of the direction of the first magnetic-pole magnetic field Hg1. Spin is injected from the first magnetic layer 11 toward the second magnetic layer 12 by the electron current Jet in the first reverse direction Dr1. The magnetization 12m rotates in the second magnetic layer 12, Thereby, the high frequency magnetic field Hac is generated.

In the second state (the second operation OP2) illustrated in FIG. 1C, spin is reflected at the interface between the second magnetic layer 12 and the intermediate layer 13 due to the electron current Je1 in the first reverse direction Dr1. The reflected spin travels to the first magnetic layer 11. Reflected spin torque is injected from the second magnetic layer 12 toward the first magnetic layer 11. The magnetization 11m of the first magnetic layer 11 is the reverse of the direction of the second magnetic-pole magnetic field Hg2. Spin is injected from the first magnetic layer 11 toward the second magnetic layer 12 by the electron current Je1 in the first reverse direction Dr1. The magnetization 12m rotates in the second magnetic layer 12. Thereby, the high frequency magnetic field Hac is generated.

For example, the first magnetic layer 11 functions as a spin injection layer. For example, the second magnetic layer 12 functions as a magnetic field generation layer.

In the embodiment, the current is caused to flow from the second magnetic layer 12 toward the first magnetic layer 11. Thereby, it was found that good oscillation characteristics are obtained even in the case where the first magnetic layer 11 is thin.

Examples of the characteristics of the embodiment will now be described with a reference example.

First, the case is described where the width (the first length L1) of the first magnetic layer 11 is the same as the width (the second length L2) of the second magnetic layer 12. An example of simulation results of the characteristics of the magnetic recording head (the characteristics of the magnetic recording and reproducing device) will now be described. The model of the simulation is as follows.

In the configuration of the magnetic recording head 110, the length in the Z-direction is 35 nm and the length in the Y-direction is 35 nm for both the first magnetic layer 11 and the second magnetic layer 12. In other words, the first length L1 is the same as the second length L2.

The thickness (the first thickness t1) in the X-direction of the first magnetic layer 11 is 2 nm or 6 nm. The saturation magnetic flux density Bs (the first saturation magnetic flux density Bs1) of the first magnetic layer 11 is 1.2 T (teslas). An anisotropic magnetic field Hk of the first magnetic layer 11 is 2 kOe (kilo-oersteds), 10 kOe, or 18 kOe. The exchange stiffness constant of the first magnetic layer 11 is $1.4 \times 10^{-6}$ erg/cm (erg/centimeter).

The thickness (the second thickness t2) in the X-direction of the second magnetic layer 12 is 10 nm. The saturation magnetic flux density Bs (the second saturation magnetic flux density Bs2) of the second magnetic layer 12 is 2.2 T. The anisotropic magnetic field Hk (the perpendicular magnetically anisotropic magnetic field) of the second magnetic layer 12 is −4 kOe. The exchange stiffness constant of the second magnetic layer 12 is $2 \times 10^6$ erg/cm.

The distance between the first magnetic layer 11 and the second magnetic layer 12 (the third thickness t3 of the intermediate layer 13) is 2 nm. The exchange coupling coefficient of the intermediate layer 13 is 0.

In the simulation, the orientation of the magnetic field (a gap magnetic field Hgap) applied to the stacked body 10 is substantially the first direction D1.

In the simulation, the orientation of the current (the current Jc1) is modified. In other words, the simulation is performed for the two cases of the case where the orientation of the current Jc1 is the first direction D1 and the case where the orientation of the current Jc1 is the first reverse direction Dr1. The case where the orientation of the current Jc1 is the first reverse direction Dr1 corresponds to the current direction of a conventional general STO. The case where the orientation of the current Jc1 is the first direction D1 corresponds to a special configuration not used conventionally.

FIG. 2A to FIG. 2D are graphs illustrating characteristics of the magnetic recording heads and the magnetic recording and reproducing devices.

Figure 2A:
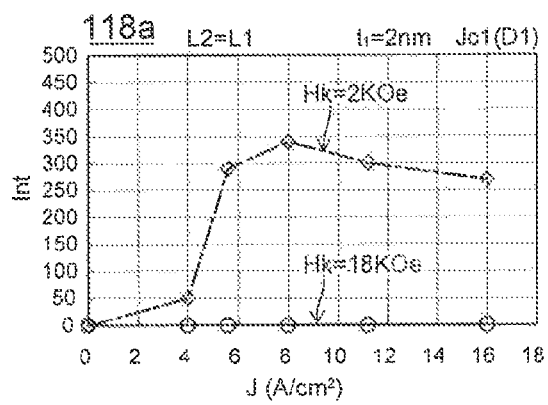
FIG. 2A to FIG. 2D are graphs illustrating characteristics of the magnetic recording heads and the magnetic recording and reproducing devices.
Figure 2B:
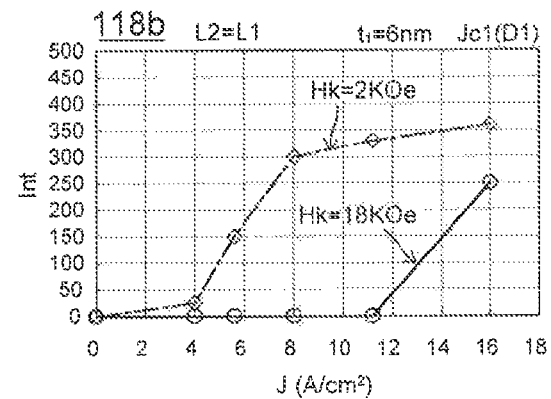
Figure 2C:
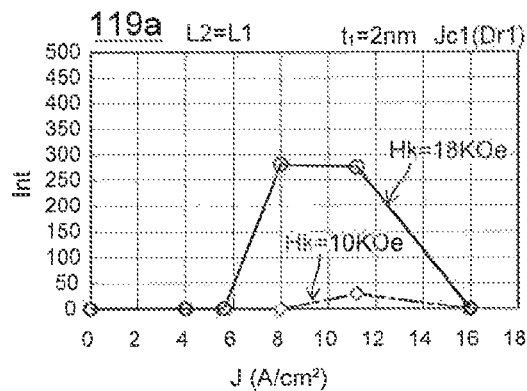
Figure 2D:
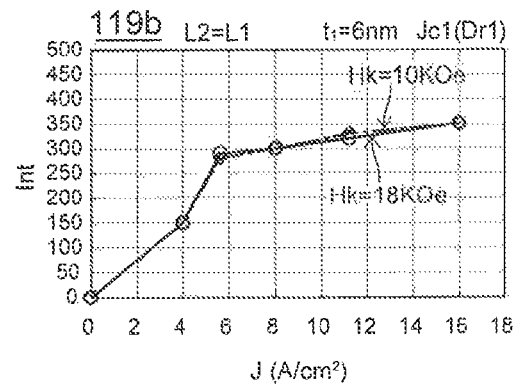

In the magnetic recording heads 118a and 118b shown in FIG. 2A and FIG. 2B, the orientation of the current Jc1 is the first direction D1. In the magnetic recording heads 119a and 119b shown in FIG. 2C and FIG. 2D, the orientation of the current Jc1 is the first reverse direction Dr1. In the magnetic recording heads 118a and 119a, the second thickness t2 is 2 nm. In the magnetic recording heads 118b and 119b, the second thickness t2 is 6 nm. In these figures, the horizontal axis is a current density J ($A/cm^2$). The vertical axis is an intensity Int (units: Oe) of the high frequency magnetic field Hac generated by the stacked body 10. In FIG. 2A and FIG. 2B, the case where the anisotropic magnetic field Hk of the first magnetic layer 11 is 2 kOe and the case where the anisotropic magnetic field Hk of the first magnetic layer 11 is 18 kOe are shown. In FIG. 2C and FIG. 2D, the case where the anisotropic magnetic field Hk of the first magnetic layer 11 is 10 kOe and the case where the anisotropic magnetic field Hk of the first magnetic layer 11 is 18 kOe are shown.

As shown in FIG. 2D, in the case where the first magnetic layer 11 is thick (the first thickness t1=6 nm) for the conventional current direction (the orientation of the current Jc1 being the first reverse direction Dr1), for both the case where the anisotropic magnetic field Hk of the first magnetic layer 11 is 10 kOe and the case where the anisotropic magnetic field Hk of the first magnetic layer 11 is 18 kOe, the intensity Int of the high frequency magnetic field Hac is high; and a stable oscillation is obtained.

As shown in FIG. 2C, in the case where the first magnetic layer 11 is thin (the first thickness t1=2 nm) for the conventional current direction (the orientation of the current Jc1 being the first reverse direction Dr1), for the case where the anisotropic magnetic field Hk of the first magnetic layer 11 is 18 kOe, the intensity Int of the high frequency magnetic field Hac is high in a range of the current density J. However, for the condition of the first magnetic layer 11 being excessively thin, the oscillation is no longer obtained at the high current density 3. On the other hand, in the case where the anisotropic magnetic field Hk of the first magnetic layer 11 is 10 kOe, the intensity Int of the high frequency magnetic field Hac is extremely low. Thus, in the case of the conventional current direction, a constraint of the anisotropic magnetic field Hk of the first magnetic layer 11 occurs when the second magnetic layer 12 is set to be thin. In other words, the appropriate oscillation is not obtained if a material having a large anisotropic magnetic field Hk is not used. The selection range of the materials of the first magnetic layer 11 becomes narrow. In other words, for the conventional current direction, it is difficult to set the thickness of the second magnetic layer 12 to be thin if a practical material is used as the first magnetic layer 11.

Thus, in the configuration of the conventional current direction (the orientation of the current Jc1 being the first reverse direction Dr1), oscillation occurs easily when the anisotropic magnetic field Hk of the first magnetic layer 11 is large.

As shown in FIG. 2B, in the case where the first magnetic layer 11 is thick (the first thickness t1=6 nm) for the current direction of the embodiment (the orientation of the current Jc1 being the first direction D1), the intensity Int of the high frequency magnetic field Hac is high for the case where the anisotropic magnetic field Hk of the first magnetic layer 11 is 18 kOe and the current density J is somewhat high. In the case where the anisotropic magnetic field Hk of the first magnetic layer 11 is 2 kOe, a high intensity Int is obtained for a wide range of the current density. For example, good oscillation is obtained easily when the anisotropic magnetic field Hk of the first magnetic layer 11 is smaller.

As shown in FIG. 2A, in the case where the first magnetic layer 11 is thin (the first thickness t1=2 nm) for the current direction of the embodiment (the orientation of the current Jc1 being the first direction D1), for the case where the anisotropic magnetic field Hk of the first magnetic layer 11 is 18 kOe, the intensity Int of the high frequency magnetic field Hac is low; and oscillation substantially does not occur. However, in the case where the anisotropic magnetic field Hk of the first magnetic layer 11 is 2 kOe, a high intensity Int is obtained in a wide range of the current density.

Thus, for the configuration of the current direction of the embodiment (the orientation of the current Jc1 being the first direction D1), oscillation occurs easily when the anisotropic magnetic field Hk of the first magnetic layer 11 is smaller. The motion in the current direction of the embodiment is the reverse of the motion in the current direction of the conventional embodiment. By using the current direction of the embodiment, good oscillation is obtained even in the case where the first magnetic layer 11 is thin. Then, a material having a small anisotropic magnetic field Hk can be used as the first magnetic layer 11. The selection range of the materials widens; and a magnetic recording head based on practical materials is obtained.

In the example of the simulation recited above, the width (the first length L1) of the first magnetic layer 11 is the same as the width (the second length L2) of the second magnetic layer 12. Characteristics in the case where the width (the first length L1) of the first magnetic layer 11 is less than the width (the second length L2) of the second magnetic layer 12 will now be described.

Figure 3A:
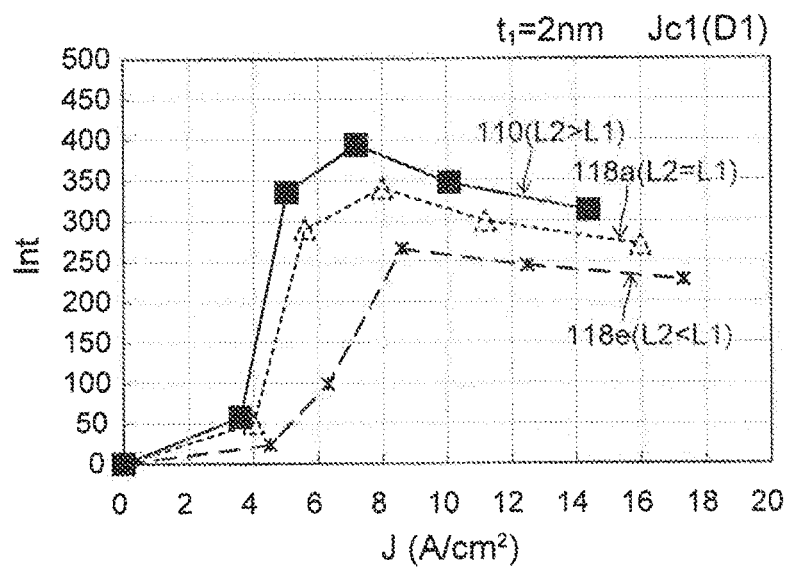
FIG. 3A and FIG. 3B are graphs illustrating characteristics of the magnetic recording head and the magnetic recording and reproducing device.
Figure 3B:
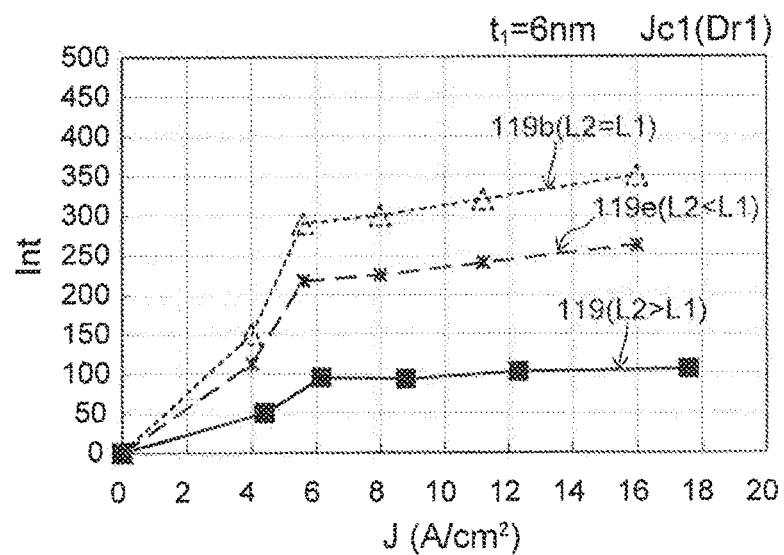

FIG. 3A and FIG. 3B are graphs illustrating characteristics of the magnetic recording head and the magnetic recording and reproducing device.

FIG. 3A shows the characteristics in the case where the orientation of the current Jc1 is the orientation of the first direction D1. In FIG. 3A, the characteristics of the magnetic recording head 110 according to the embodiment are shown in addition to the characteristics of the magnetic recording head 118a illustrated in FIG. 2A. As described above, in the magnetic recording head 118a, the length in the Z-direction is 35 nm and the length in the Y-direction is 35 nm (L2=L1) for both the first magnetic layer 11 and the second magnetic layer 12. On the other hand, in the magnetic recording head 110, the width (the first length L1) of the first magnetic layer 11 is 28 nm; and the width (the second length L2) of the second magnetic layer 12 is 46 nm. In other words, the width (the first length L1) of the first magnetic layer 11 is less than the width (the second length L2) of the second magnetic layer 12 (L2>L1).

The characteristics of a magnetic recording head 118e of a reference example are further shown in FIG. 3A. In the magnetic recording head 118e, the width (the first length L1) of the first magnetic layer 11 is 42 nm; and the width (the second length L2) of the second magnetic layer 12 is 24 nm. In other words, the width (the first length L1) of the first magnetic layer 11 is greater than the width (the second length L2) of the second magnetic layer 12 (L2<L1). In the magnetic recording heads 118a, 110, and 118e, the anisotropic magnetic field Hk of the first magnetic layer 11 is 2 kOe.

FIG. 3B shows the characteristics in the case where the orientation of the current Jc1 is the first reverse direction Dr1. In FIG. 3B, the characteristics of magnetic recording heads 119 and 119e of reference examples are shown in addition to the characteristics of the magnetic recording head 119b illustrated in FIG. 2D. As described above, in the magnetic recording head 119b, the length in the Z-direction is 35 nm and the length in the Y-direction is 35 nm (L2=L1) for both the first magnetic layer 11 and the second magnetic layer 12. In the magnetic recording head 119, the width (the first length L1) of the first magnetic layer 11 is 28 nm; and the width (the second length L2) of the second magnetic layer 12 is 46 nm (L2>L1). In the magnetic recording head 119e, the width (the first length L1) of the first magnetic layer 11 is 42 nm; and the width (the second length L2) of the second magnetic layer 12 is 24 nm (L2<L1). In the magnetic recording heads 119b, 119, and 119e, the anisotropic magnetic field Hk of the first magnetic layer 11 is 18 kOe.

In these figures, the horizontal axis is the current density J; and the vertical axis is the intensity Int of the high frequency magnetic field Hac.

As shown in FIG. 3A, for the current direction according to the embodiment (the orientation of the current Jc1 being the first direction D1), the intensity Int of the high frequency magnetic field Hac of the magnetic recording head 110 (L2>L1) is higher than that of the magnetic recording head 118a (L2=L1). The current density J at which the intensity Int of the high frequency magnetic field Hac becomes high is lower for the magnetic recording head 110 than for the magnetic recording head 118a. In other words, in the magnetic recording head 110, a high intensity Int Is obtained using low-current driving. On the other hand, in the magnetic recording head 118e (L2<L1), the current density J necessary for the oscillation becomes high; and the Intensity Int of the high frequency magnetic field Hac that is obtained is low compared to the magnetic recording head 118a.

On the other hand, when the orientation of the current Jc1 Is the first reverse direction Dr1 as shown in FIG. 3B, the intensity Int of the high frequency magnetic field Hac of the magnetic recording head 119 (L2>L1) is lower than that of the magnetic recording head 119b (L2=L1). Also, the current density J at which the intensity Int of the high frequency magnetic field Hac becomes high is higher for the magnetic recording head 119 than for the magnetic recording head 118b. In the magnetic recording head 119e (L2<L1), the current density J necessary for the oscillation becomes high; and the intensity Int of the high frequency magnetic field Hac obtained is small compared to the magnetic recording head 119b.

Thus, in the case where the orientation of the current Jc1 is the first direction D1, compared to the condition of "L2=L1," a high intensity Int of the high frequency magnetic field Hac is obtained using low-current driving for the condition of "L2>L1." For "L2<L1" In the case where the orientation of the current Jc1 is the first direction D1, the drive current becomes large; and the intensity Int of the high frequency magnetic field Hac weakens. Conversely, for "L2>L1" in the case where the orientation of the current Jc1 is the first reverse direction Dr1, compared to the condition of "L2=L1," the drive current becomes markedly large; and the intensity Int of the high frequency magnetic field Hac decreases. These characteristics are worse than those of the case of "L2<L1."

Thus, the characteristics improve in the case where the orientation of the current Jc1 is the first direction D1 and the first length L1 is shorter than the second length L2. Conversely, the characteristics degrade in the case where the orientation of the current Jc1 is the first reverse direction Dr1 and the first length L1 is shorter than the second length L2. In other words, the motion in the case where the orientation of the current Jc1 is the first direction D1 is different and Is the reverse of the motion in the case where the orientation of the current Jc1 is the first reverse direction Dr1.

By setting the width (the first length L1) of the first magnetic layer 11 to be less than the width (the second length L2) of the second magnetic layer 12, a high intensity Int of the high frequency magnetic field Hac Is obtained; and characteristics in which low-current driving is possible are obtained especially in the current direction according to the embodiment (the orientation of the current Jc1 being the first direction D1).

The characteristics Illustrated in FIG. 3A and FIG. 3B can be considered to be as follows.

In the case where the orientation of the current Jc1 Is the first direction D1 (referring to FIG. 3A) and in the case where the width (the first length L1) of the first magnetic layer 11 is small, it is considered that the magnetization of the first magnetic layer 11 easily becomes the reverse orientation of the gap magnetic field Hgap at a low current density J. In the magnetization state of the reverse orientation, the first magnetic layer 11 receives spin torque from the second magnetic layer 12. When the volume of the first magnetic layer 11 is small, it is considered that the magnetization of the first magnetic layer 11 reverses easily with respect to the gap magnetic field Hgap. Conversely, in the case where the width (the first length L1) of the first magnetic layer 11 is large, the current density 3 for the reversal increases. Therefore, it is considered that the current density for the oscillation becomes high.

As shown in FIG. 3A, when the width (the first length L1) of the first magnetic layer is small (when the volume of the second magnetic layer 12 is relatively large), the intensity Int of the high frequency magnetic field Hac becomes high. From this result, for the intensity Int of the high frequency magnetic field Hac of the embodiment (L2>L1), it is considered that the effects of the second magnetic layer 12 having the large saturation magnetization are large; and the effects are small due to the volume decrease amount of the first magnetic layer 11 having a small saturation magnetization.

On the other hand, for the operations in the case where the orientation of the current Jc1 is the first reverse direction Dr1 (referring to FIG. 3B), the magnetization of the first magnetic layer 11 (i.e., the spin injection layer) is oriented parallel to the magnetization of the second magnetic layer 12 (i.e., the generation layer). Further, these magnetizations are oriented in the same direction that defies the spin torque generated by the generation layer. Therefore, as Illustrated in FIG. 2C and FIG. 2D, the oscillation Is first obtained by setting the anisotropic magnetic field Hk of the spin injection layer to be high.

In such an operation, in the case where the width (the first length L1) of the first magnetic layer 11 is large, the magnetization of the first magnetic layer 11 can defy the spin torque from the second magnetic layer. However, conversely, in the case where the width of the first magnetic layer 11 is small, it is difficult to maintain the state in which the magnetization of the first magnetic layer 11 is in the same direction as the magnetization of the second magnetic layer 12.

In such an operation, in the case where the width of the first magnetic layer 11 is large, oscillation that sufficiently defies the spin torque can be obtained. However, the Intensity Int of the high frequency magnetic field Hac decreases because the volume of the second magnetic layer 12 having the large magnetic thickness decreases. On the other hand, it is expected that the intensity Int of the high frequency magnetic field Hac will be high in the case where the width of the first magnetic layer 11 is small (as a result, the volume of the second magnetic layer increases relatively). However, as shown in FIG. 3B, the intensity Int of the high frequency magnetic field Hac is low in the case where the width (the first length L1) of the first magnetic layer 11 is small.

The volume of the first magnetic layer 11 is small because the width of the first magnetic layer 11 is small and the thickness of the first magnetic layer 11 is designed to be thin for the narrow gap. Therefore, the magnetization of the first magnetic layer 11 cannot defy the spin torque from the second magnetic layer 12; and the parallel state of the magnetization can no longer be maintained. As a result, it is considered that the appropriate oscillation is not obtained. In the case where the gap length g20 is large, the thickness to defy the spin torque can be ensured because the thickness of the spin Injection layer can be sufficiently large. Thereby, it is considered that this problem can be avoided. However, in the case where the gap length g20 is set to be narrow, the thickness cannot be reduced.

FIG. 4A to FIG. 4E are schematic views Illustrating operations of the magnetic recording head and the magnetic recording and reproducing device.

FIG. 4A illustrates a state in which the current is not flowing in the stacked body 10. In the example, the magnetization 11m of the first magnetic layer 11 and the magnetization 12m of the second magnetic layer 12 are aligned with the first reverse direction Dr1 (upward).

As shown in FIG. 4B, in the case where the current Jc1 flows in the first reverse direction Dr1 (the conventional case), it is considered that the oscillation is generated in the second magnetic layer 12 by the action of reflected spin torque STr. At this time, the orientation of the magnetization 11m of the first magnetic layer 11 is the same as that of the state of FIG. 4A (upward).

As shown in FIG. 4C, in the initial stage of the current Jc1 flowing in the first direction D1, the reflected spin torque STr acts on the magnetization 11m of the first magnetic layer 11 from the magnetization 12m of the second magnetic layer 12. Therefore, fluctuation of the magnetization 11m of the first magnetic layer 11 occurs.

The state changes to the state shown in FIG. 4D when the spin torque becomes stronger than that of the state of FIG. 4C (the current increases slightly). As shown in FIG. 4D, the magnetization 11m of the first magnetic layer 11 reverses from the state of FIG. 4A (downward).

Subsequently, as shown in FIG. 4E, transmitted spin torque STt acts on the magnetization 12m of the second magnetic layer 12. The magnetization 11m of the first magnetic layer 11 rotates in the downward state. On the other hand, the magnetization 12m of the second magnetic layer 12 rotates in the upward state. When a sufficiently large spin torque is applied, the magnetization 12m of the second magnetic layer 12 is oriented in a direction that is 90 degrees from the rotation axis. At this time, the second magnetic layer 12 generates a maximum high frequency magnetic field strength. Thereby, a high frequency magnetic field having a high intensity is obtained. For example, the magnetization 11m of the first magnetic layer 11 when the current Jc1 flows has a component of the reverse orientation of the component of the magnetization 11m of the first magnetic layer 11 when the current Jc1 Is not flowing.

In the embodiment, the magnetic pole 20 includes, for example, an FeCo alloy, an FeCoNi alloy, etc.

The shield 20s includes, for example, an FeCo alloy, an FeCoNi alloy, etc.

At least one of the first magnetic layer 11 or the second magnetic layer 12 includes, for example, at least one of an FeCo alloy, a Heusler alloy, a [Fe/Co] artificial lattice, a [FeCoNi/Ni] artificial lattice, or a [Co/Pt] artificial lattice. At least one of the first magnetic layer 11 or the second magnetic layer 12 may include a stacked film including at least two of an FeCo alloy film, a Heusler alloy film, a [Fe/Co] artificial lattice film, a [FeCoNi/Ni] artificial lattice film, or a [Co/Pt] artificial lattice film.

The intermediate layer 13 includes, for example, at least one of Cu or Ag. The intermediate layer 13 may include, for example, at least one of an alloy including Cu or an alloy including Ag. The intermediate layer 13 may include, for example, a stacked film including at least two of a Cu film, a Ag film, an alloy film including Cu, or an alloy film including Ag. The intermediate layer 13 may include, for example, an oxide of MgO (magnesium oxide), etc. The Intermediate layer 13 may include, for example, an oxide of at least one of magnesium, aluminum, or titanium.

At least one of the first nonmagnetic layer 15 or the second nonmagnetic layer 16 includes, for example, at least one of Ta, Cu, Pt, or Pd. At least one of the first nonmagnetic layer 15 or the second magnetic layer 12 may include an alloy Including any of these elements. At least one of the first nonmagnetic layer 15 or the second nonmagnetic layer 16 may include a stacked film including at least two of these films.

The magnetic recording medium 80 includes, for example, a $CoCrPt$—$SiO_2$ granular film.

In the first state as shown in FIG. 1B, the first magnetic-pole magnetic field Hg1 that has the component along the first direction D1 is generated from the magnetic pole 20. In the second state as shown in FIG. 1C, the second magnetic-pole magnetic field Hg2 that has the component along the first reverse direction Dr1 from the first magnetic layer 11 toward the second magnetic layer 12 is generated from the magnetic pole 20. In the first state, the magnetization 11m of the first magnetic layer 11 has the component in the first reverse direction Dr1. In the second state, the magnetization 11m of the first magnetic layer 11 has the component in the first direction D1. In such a first state and such a second state, the stacked body 10 generates the high frequency magnetic field Hac. The frequency of the high frequency magnetic field Hac is, for example, not less than 5 gigahertz and not more than 25 gigahertz.

As shown in FIG. 1B, for example, the first magnetic-pole magnetic field Hg1 is generated from the magnetic pole 20 by supplying the first coil current C1 to the coil 25 in the first state. As shown in FIG. 1C, the second magnetic-pole magnetic field Hg2 is generated from the magnetic pole 20 by supplying the second coil current C2 to the coil 25 in the second state. The controller 55 supplies the first coil current C1 to the coil 25 and supplies the current Jc1 to the stacked body 10 in the first state. The controller 55 supplies the second coil current C2 to the coil 25 and supplies the current Jc1 to the stacked body 10 in the second state.

In the magnetic recording head 110 illustrated in FIG. 1A, the second direction D2 is aligned with the Z-axis direction. In other words, the second direction D2 crosses the medium-opposing surface 51 of the magnetic pole 20.

In the example shown in FIG. 1A, the side surface of the stacked body 10 is tilted in a tapered configuration. The position of the side surface of the stacked body changes continuously. For example, the first magnetic layer 11 has a first side surface 11sf crossing the second direction D2; and the second magnetic layer 12 has a second side surface 12sf crossing the second direction D2 (referring to FIG. 1A). For example, the second side surface 12sf is in a plane including the first side surface 11sf.

In the example shown in FIG. 1A, the first side surface 11sf of the first magnetic layer 11 is tilted with respect to the first direction D1. Also, the second side surface 12sf of the second magnetic layer 12 is tilted with respect to the first direction D1.

Various modifications of the configuration of the stacked body are possible in the embodiment. Examples of the configuration of the stacked body will now be described.

Figure 5A:
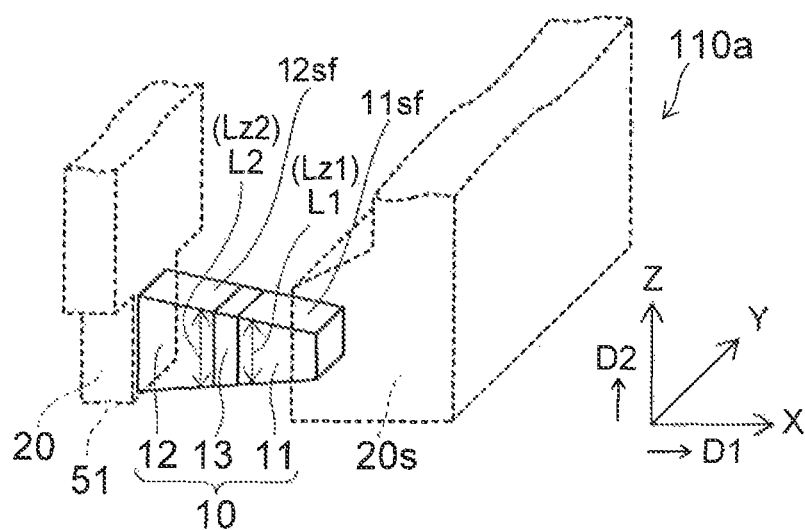
FIG. 5A to FIG. 5C are schematic perspective views illustrating other magnetic recording heads according to the first embodiment.
Figure 5B:
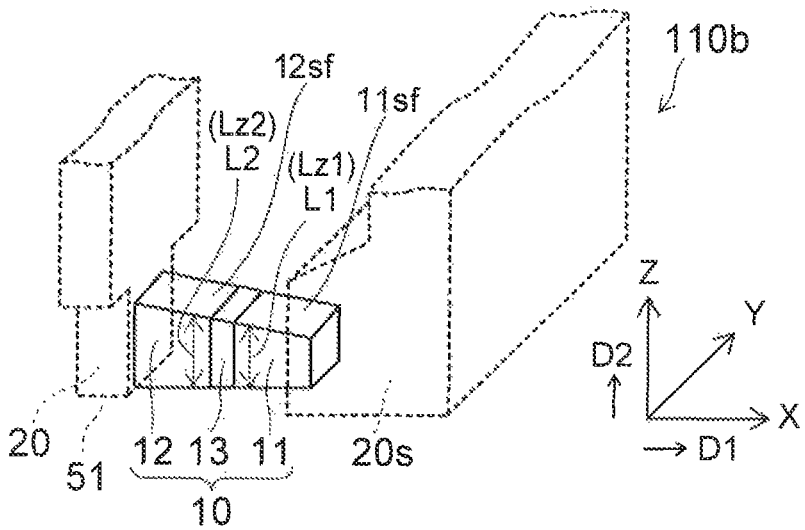
Figure 5C:
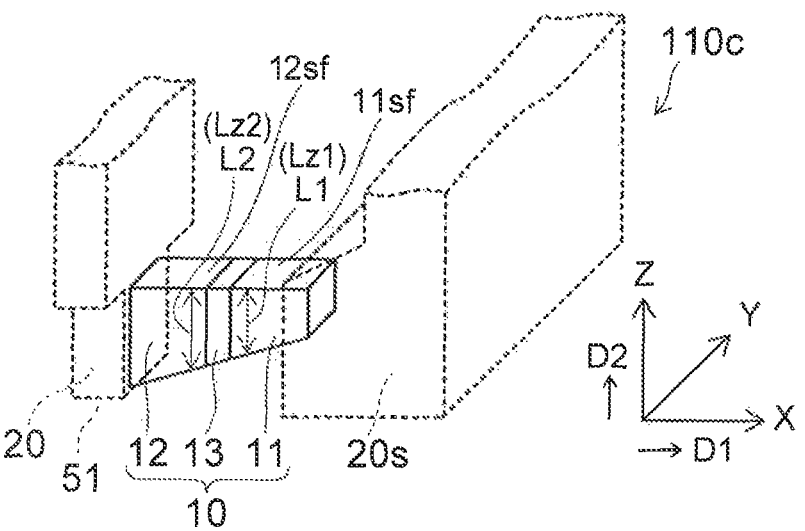

FIG. 5A to FIG. 5C are schematic perspective views Illustrating other magnetic recording heads according to the first embodiment.

As shown in FIG. 5A to FIG. 5C, in magnetic recording heads 110a to 110c, the length Lz1 (the first length L1) in the Z-direction of the first magnetic layer 11 is shorter than the length Lz2 (the second length L2) In the Z-direction of the second magnetic layer 12. The second direction D2 crosses the medium-opposing surface 51.

In the magnetic recording head 110a, the two side surfaces of the first side surface 11sf of the first magnetic layer 11 opposing each other in the Z-direction are tilted with respect to the first direction D1.

In the magnetic recording head 110b, one of the two side surfaces of the first side surface 11sf of the first magnetic layer 11 opposing each other in the Z-direction is tilted with respect to the first direction D1. The other one of the two side surfaces (the side surface on the medium-opposing surface 51 side) is aligned with the first direction D1.

In the magnetic recording head 110c, one of the two side surfaces of the first side surface 11sf of the first magnetic layer 11 opposing each other in the Z-direction is tilted with respect to the first direction D1. The other one of the two side surfaces (the side surface on the opposite side of the medium-opposing surface 51) is aligned with the first direction D1.

Figure 6A:
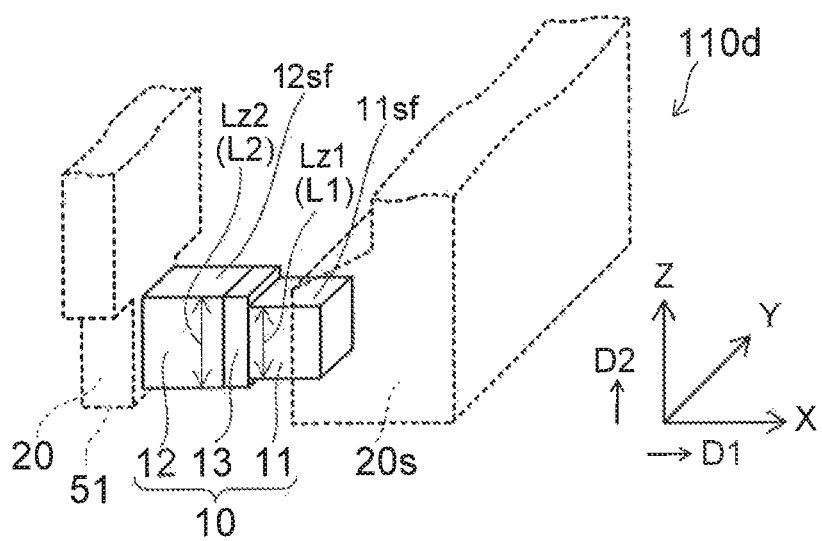
FIG. 6A to FIG. 6C are schematic perspective views illustrating other magnetic recording heads according to the first embodiment.
Figure 6B:
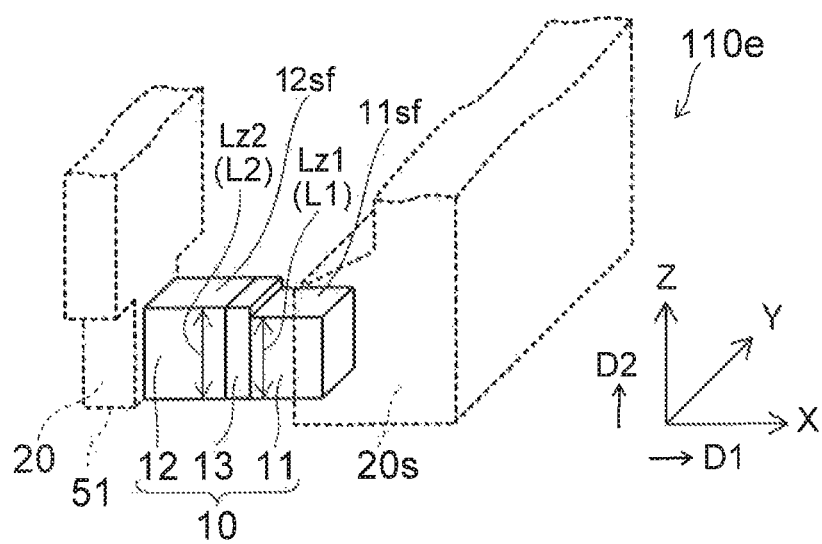
Figure 6C:
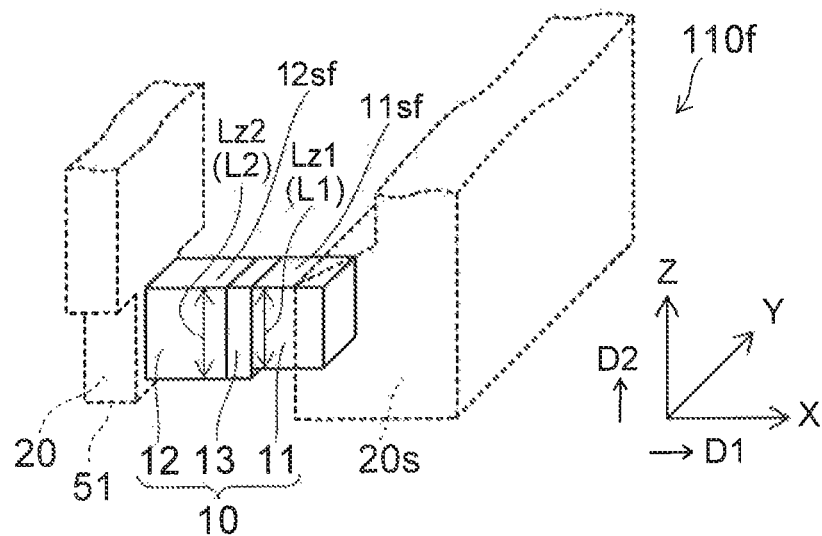

FIG. 6A to FIG. 6C are schematic perspective views illustrating other magnetic recording heads according to the first embodiment.

In magnetic recording heads 110d to 110f as shown in FIG. 6A to FIG. 6C, the length Lz1 (the first length L1) in the Z-direction of the first magnetic layer 11 is shorter than the length Lz2 (the second length L2) in the Z-direction of the second magnetic layer 12. In the magnetic recording heads 110d to 110f, the first length L1 changes discontinuously with the second length L2.

Figure 7A:
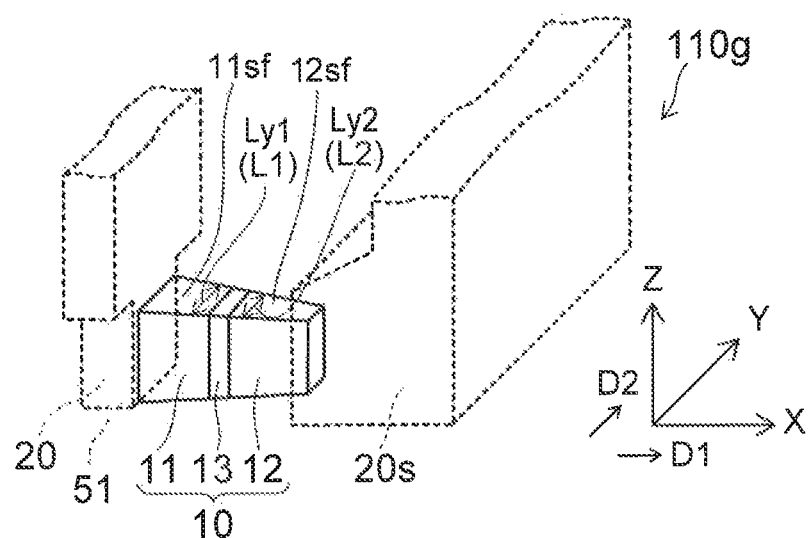
FIG. 7A to FIG. 7C are schematic perspective views illustrating other magnetic recording heads according to the first embodiment.
Figure 7B:
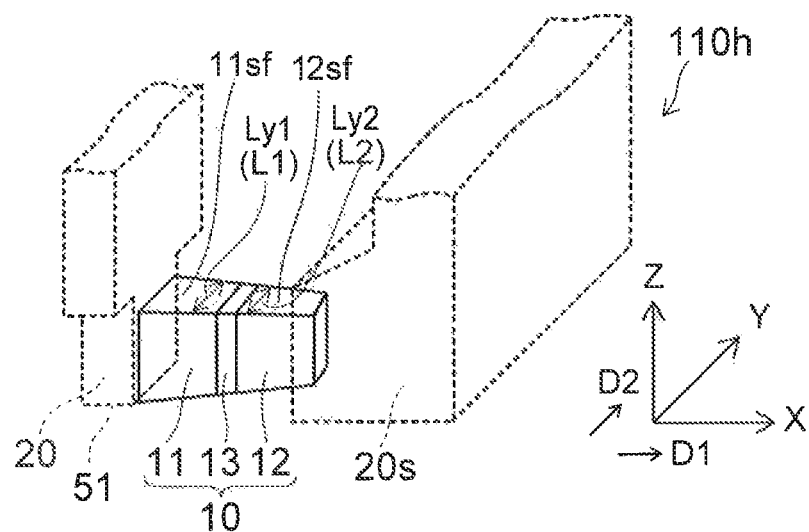
Figure 7C:
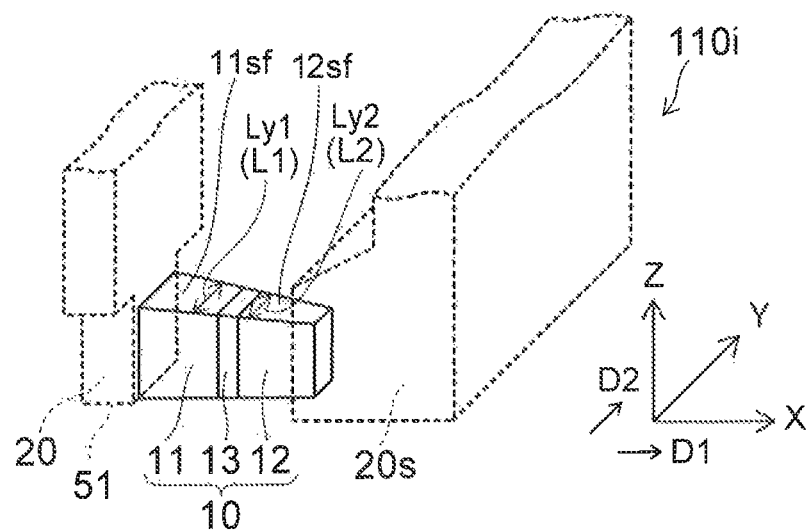

FIG. 7A to FIG. 7C are schematic perspective views illustrating other magnetic recording heads according to the first embodiment.

In magnetic recording heads 110g to 110i as shown in FIG. 7A to FIG. 7C, a length Ly1 (the first length L1) in the Y-direction of the first magnetic layer 11 is shorter than a length Ly2 (the second length L2) in the Y-direction of the second magnetic layer 12. The second direction D2 is aligned with the medium-opposing surface 51.

In the magnetic recording head 110g, the two side surfaces of the first side surface 11sf of the first magnetic layer 11 opposing each other in the Y-direction are tilted with respect to the first direction D1.

In the magnetic recording heads 110h and 110i, one of the two side surfaces of the first side surface 11sf of the first magnetic layer 11 opposing each other in the Y-direction is tilted with respect to the first direction D1. The other one of the two side surfaces is aligned with the first direction D1.

Figure 8A:
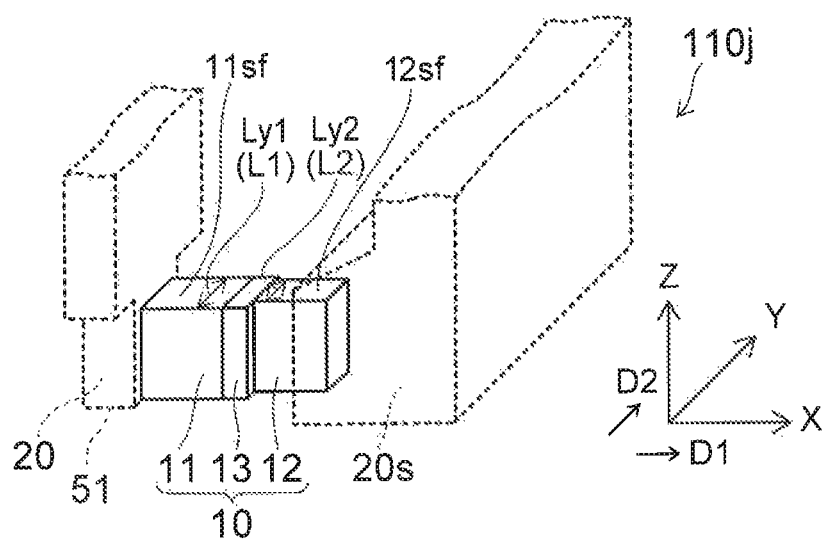
FIG. 8A to FIG. 8C are schematic perspective views illustrating other magnetic recording heads according to the first embodiment.
Figure 8B:
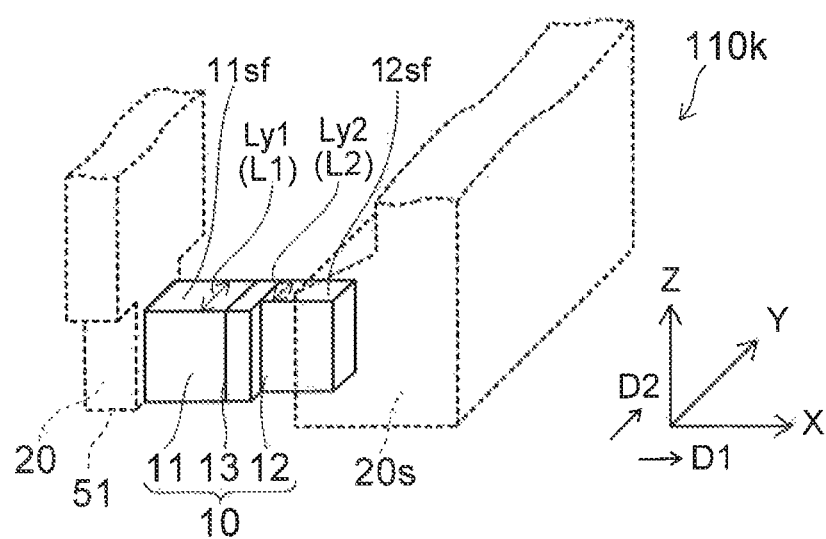
Figure 8C:
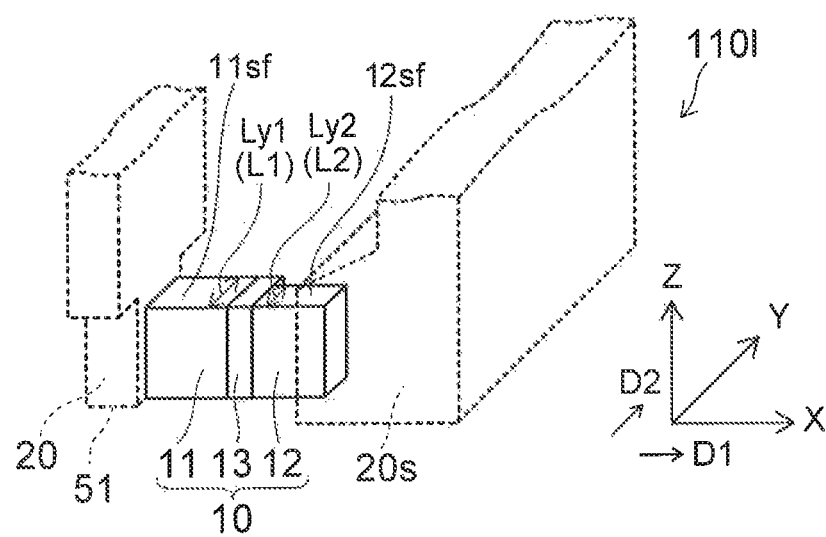

FIG. 8A to FIG. 8C are schematic perspective views illustrating other magnetic recording heads according to the first embodiment.

In magnetic recording heads 110j to 110l as shown in FIG. 8A to FIG. 8C, the length Ly1 (the first length L1) in the Y-direction of the first magnetic layer 11 is shorter than the length Ly2 (the second length L2) in the Y-direction of the second magnetic layer 12. In the magnetic recording heads 110j to 110l, the first length L1 changes discontinuously with the second length L2.

Figure 9A:
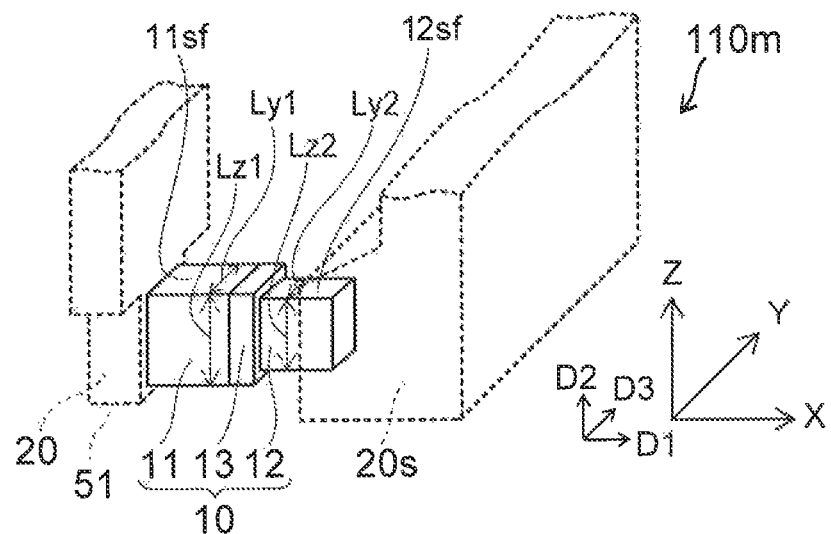
FIG. 9A and FIG. 9B are schematic perspective views illustrating other magnetic recording heads according to the first embodiment.
Figure 9B:
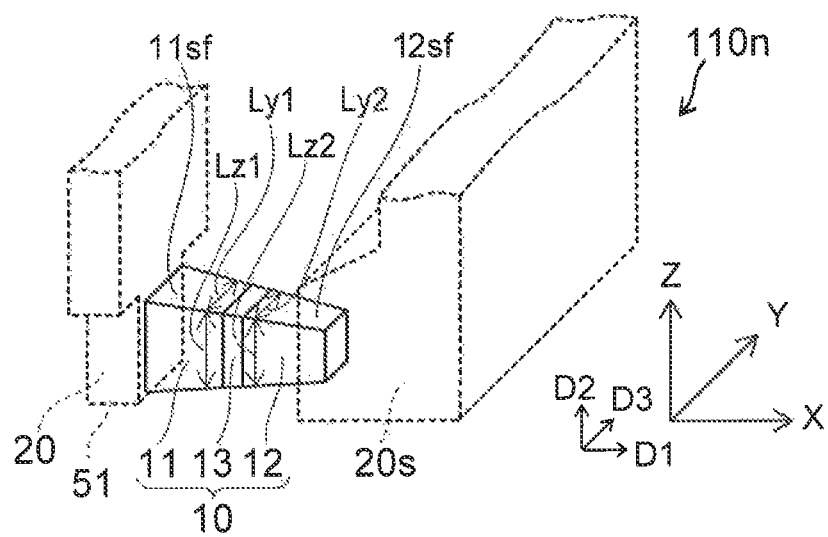

FIG. 9A and FIG. 9B are schematic perspective views illustrating other magnetic recording heads according to the first embodiment.

In magnetic recording heads 110m and 110n as shown in FIG. 9A and FIG. 9B, the length Lz1 in the Z-direction of the first magnetic layer 11 is shorter than the length Lz2 in the Z-direction of the second magnetic layer 12. Further, the length Ly1 in the Y-direction of the first magnetic layer 11 is shorter than the length Ly2 in the Y-direction of the second magnetic layer 12.

For example, a direction perpendicular to the first direction D1 and crossing the second direction D2 is taken as a third direction D3. In the magnetic recording heads 110m and 110n, the first length L1 of the first magnetic layer 11 in the second direction D2 is shorter than the second length L2 of the second magnetic layer 12 in the second direction D2. Further, the length (a third length L3) of the first magnetic layer 11 in the third direction D3 is shorter than the length (a fourth length L4) of the second magnetic layer 12 in the third direction D3. For example, the second direction D2 crosses the medium-opposing surface 51. The third direction D3 is aligned with the medium-opposing surface 51.

In the magnetic recording head 110m, the first length L1 changes discontinuously with the second length L2. The third length L3 changes discontinuously with the fourth length L4.

In the magnetic recording head 110n, the two side surfaces of the first side surface 11sf of the first magnetic layer 11 opposing each other in the Z-direction are tilted with respect to the first direction D1. The two side surfaces of the first side surface 11sf of the first magnetic layer 11 opposing each other in the Y-direction are tilted with respect to the first direction D1.

Figure 10A:
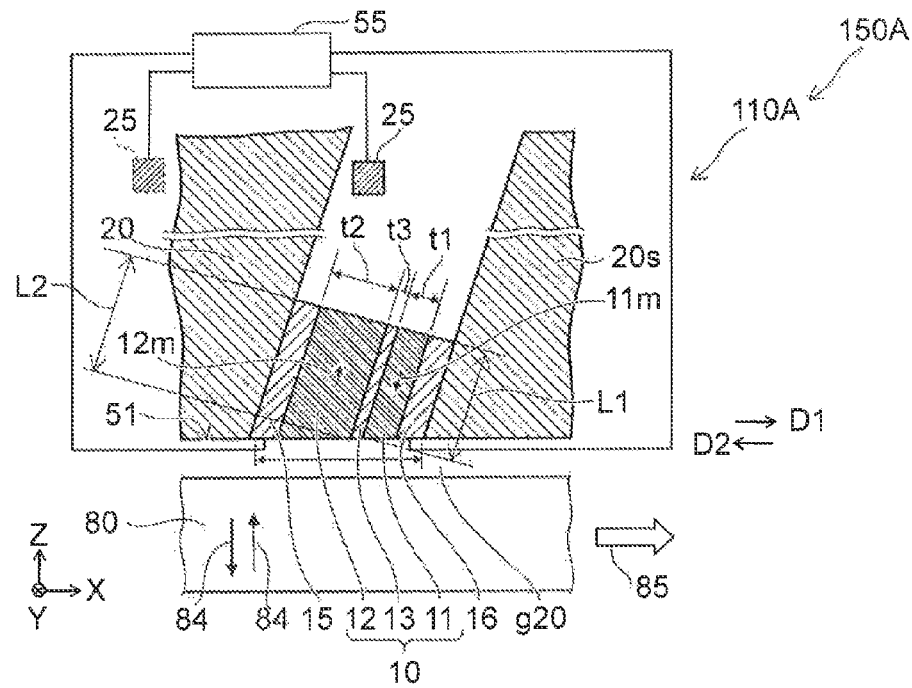
FIG. 10A to FIG. 10C are schematic cross-sectional views illustrating another magnetic recording head and another magnetic recording and reproducing device according to the first embodiment.
Figures 10B, 10C:
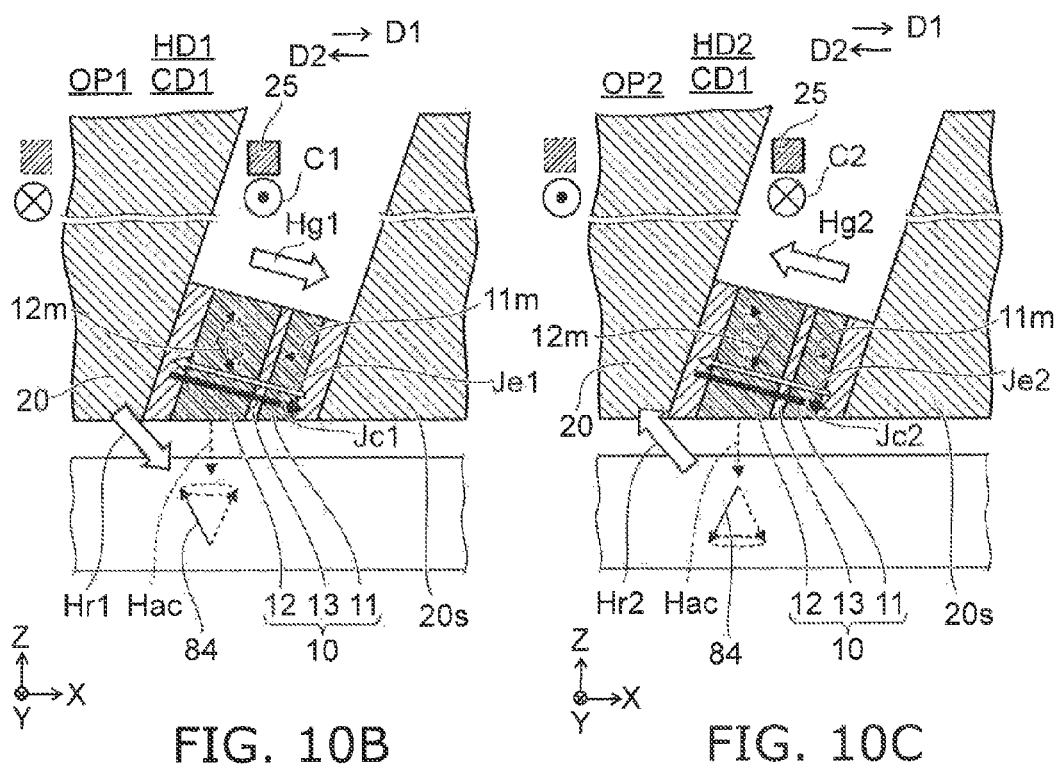

FIG. 10A to FIG. 10C are schematic cross-sectional views Illustrating another magnetic recording head and another magnetic recording and reproducing device according to the first embodiment.

FIG. 10B and FIG. 10C illustrate states (operations) of a magnetic recording head and a magnetic recording and reproducing device.

As shown in FIG. 10A, the magnetic recording and reproducing device 150A according to the embodiment includes the magnetic recording medium 80 and the magnetic recording head 110A according to the embodiment. In the embodiment, the stacking direction of the first magnetic layer 11 and the second magnetic layer 12 is tilted with respect to the medium-opposing surface 51. Otherwise, the magnetic recording head 110A is similar to the magnetic recording head 110.

In the magnetic recording head 110A and the magnetic recording and reproducing device 150A as well, the second product of the second thickness t2 and the second saturation magnetic flux density is larger than the first product of the first thickness t1 and the first saturation magnetic flux density. For example, the first thickness t1 is thinner than the second thickness t2. Further, the first length L1 of the first magnetic layer 11 in the second direction D2 (one direction perpendicular to the first direction D1) is shorter than the second length L2 of the second magnetic layer 12 in the second direction D2.

As shown in FIG. 10B and FIG. 10C, a current (the current Jc1) flows from the second magnetic layer 12 toward the first magnetic layer 11. In the magnetic recording head 110A and the magnetic recording and reproducing device 150A as well, a magnetic recording head and a magnetic recording and reproducing device can be provided in which the recording density can be increased. Low-current driving is possible.

Second Embodiment

FIG. 11A to FIG. 11C are schematic cross-sectional views illustrating a magnetic recording head and a magnetic recording and reproducing device according to a second embodiment.

FIG. 11B and FIG. 11C illustrate states (operations) of the magnetic recording head and the magnetic recording and reproducing device.

As shown in FIG. 11A, the magnetic recording and reproducing device 151 according to the embodiment includes the magnetic recording medium 80 and the magnetic recording head 111 according to the embodiment. In the embodiment, the arrangement of the first magnetic layer 11 and the second magnetic layer 12 is different from the arrangement in the magnetic recording head 110. The portions that are similar to those of the magnetic recording head 110 are omitted as appropriate in the description of the magnetic recording head 111 recited below.

The magnetic recording head 111 includes the magnetic pole 20, the shield 20s, the stacked body 10, and the first nonmagnetic layer 15. The shield 20s is, for example, a trailing shield. The stacked body 10 includes the first magnetic layer 11, the second magnetic layer 12, and the intermediate layer 13. The first magnetic layer 11 is provided between the magnetic pole 20 and the shield 20s. The second magnetic layer 12 is provided between the first magnetic layer 11 and the shield 20s. The intermediate layer 13 is provided between the first magnetic layer 11 and the second magnetic layer 12 and is nonmagnetic.

The first nonmagnetic layer 15 is provided between the second magnetic layer 12 and the shield 20s. The first nonmagnetic layer 15 contacts the shield 20s and the second magnetic layer 12.

The second nonmagnetic layer 16 is provided between the first magnetic layer 11 and the magnetic pole 20.

The direction from the second magnetic layer 12 toward the first magnetic layer 11 is taken as the first direction D1. The first direction D1 is the reverse of the X-direction. The direction from the first magnetic layer 11 toward the second magnetic layer 12 is taken as the first reverse direction Dr1. The first reverse direction Dr1 is the same as the X-direction.

In the example as well, the first magnetic layer 11 has the first thickness t1 along the first direction D1, and the first saturation magnetic flux density Bs1. The second magnetic layer 12 has the second thickness t2 along the first direction D1, and the second saturation magnetic flux density Bs2. In the example as well, the second product of the second thickness t2 and the second saturation magnetic flux density Bs2 is larger than the first product of the first thickness t1 and the first saturation magnetic flux density Bs1.

The first length L1 of the first magnetic layer 11 in the second direction D2 (one direction perpendicular to the first direction D1) is shorter than the second length L2 of the second magnetic layer 12 in the second direction D2. In the example, the second direction D2 corresponds to the Z-direction. The second direction D2 crosses the medium-opposing surface 51.

FIG. 11B corresponds to the first operation OP1 (the first state). In the first state, the first magnetic-pole magnetic field Hg1 that is generated from the magnetic pole 20 has a component along the first reverse direction Dr1. At this time, the current Jc1 flows in the first direction D1 in the stacked body 10. At this time, the orientation of the electron current Je1 is the reverse of the orientation of the current Jc1.

FIG. 11C corresponds to the second operation OP2 (the second state). In the second state, the second magnetic-pole magnetic field Hg2 that is generated from the magnetic pole 20 has a component along the first direction D1. At this time as well, the current Jc1 flows in the first direction D1 In the stacked body 10.

By such operations, a good high frequency magnetic field Hac is obtained even in the case where the first magnetic layer 11 is thin. Thereby, a magnetic recording head and a magnetic recording and reproducing device can be provided in which the recording density can be increased.

The coil 25 may be provided in the embodiment. The first magnetic-pole magnetic field Hg1 is generated from the magnetic pole 20 by supplying the first coil current C1 to the coil 25 in the first state. The second magnetic-pole magnetic field Hg2 is generated from the magnetic pole 20 by supplying the second coil current C2 to the coil 25 in the second state.

The controller 55 may be further provided in the embodiment. The controller 55 supplies the first coil current C1 to the coil 25 and supplies the current Jc1 to the stacked body 10 in the first state. The controller 55 supplies the second coil current C2 to the coil 25 and supplies the current Jc1 to the stacked body 10 in the second state.

In the example shown in FIG. 11A, the first side surface 11sf of the first magnetic layer 11 is tilted with respect to the first direction D1. The second side surface 12sf of the second magnetic layer 12 also is tilted with respect to the first direction D1.

Various modifications of the configuration of the stacked body are possible in the embodiment. Examples of the configuration of the stacked body will now be described.

Figure 12A:
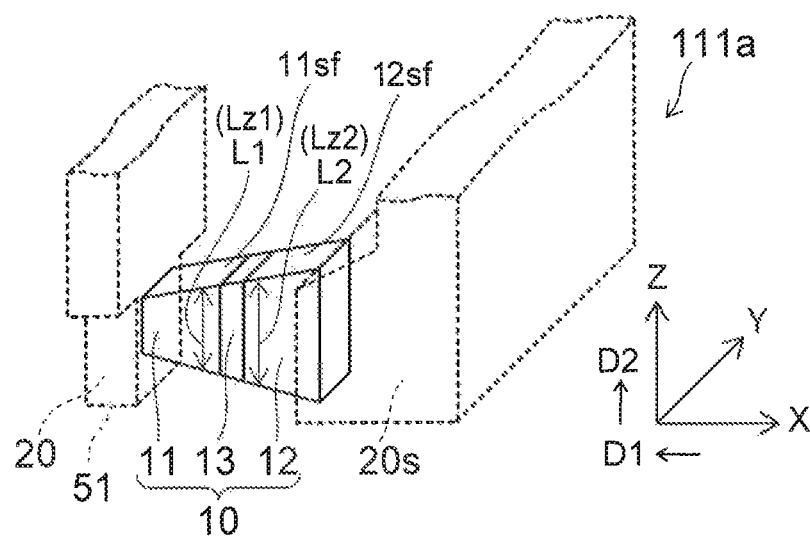
FIG. 12A to FIG. 12C are schematic perspective views illustrating other magnetic recording heads according to the second embodiment.
Figure 12B:
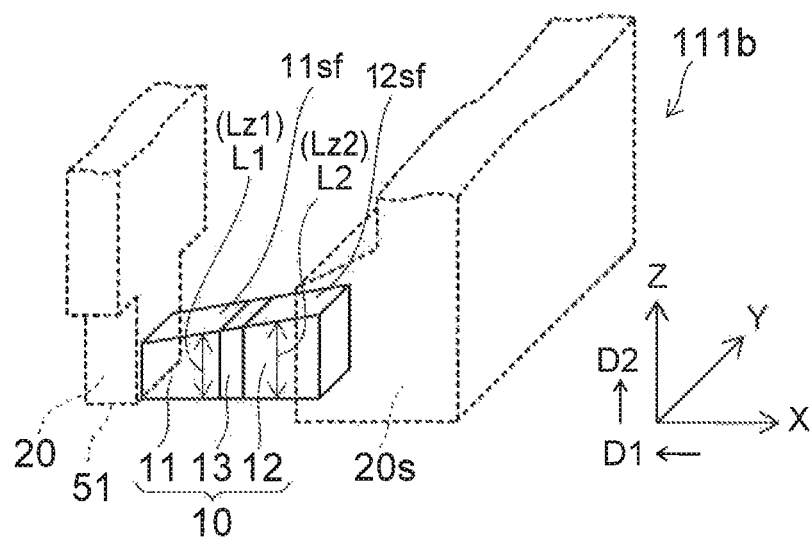
Figure 12C:
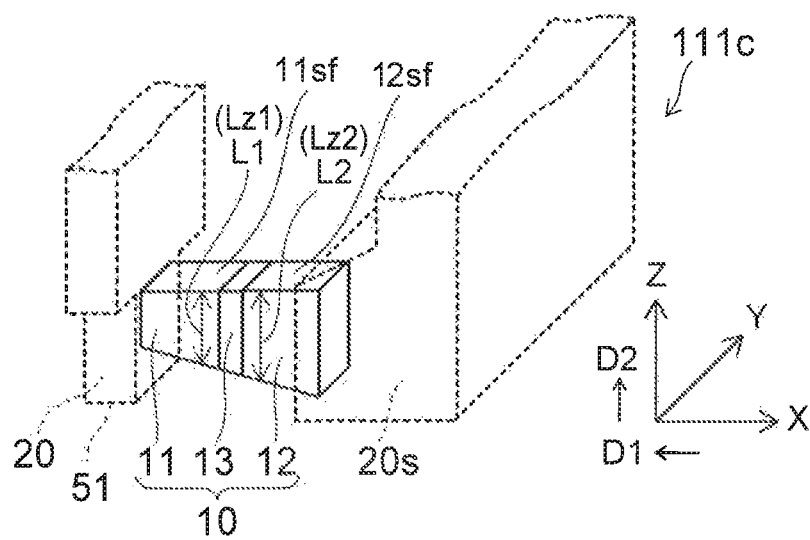

FIG. 12A to FIG. 12C are schematic perspective views illustrating other magnetic recording heads according to the second embodiment.

In magnetic recording heads 111a to 111c as shown in FIG. 12A to FIG. 12C, the length Lz1 (the first length L1) In the Z-direction of the first magnetic layer 11 is shorter than the length Lz2 (the second length L2) in the Z-direction of the second magnetic layer 12. The second direction D2 crosses the medium-opposing surface 51.

In the magnetic recording head 111a, the two side surfaces of the first side surface 11sf of the first magnetic layer 11 opposing each other in the Z-direction are tilted with respect to the first direction D1.

In the magnetic recording head 111b, one of the two side surfaces of the first side surface 11sf of the first magnetic layer 11 opposing each other in the Z-direction is tilted with respect to the first direction D1. The other one of the two side surfaces (the side surface on the medium-opposing surface 51 side) is aligned with the first direction D1.

In the magnetic recording head 111c, one of the two side surfaces of the first side surface 11sf of the first magnetic layer 11 opposing each other in the Z-direction Is tilted with respect to the first direction D1. The other one of the two side surfaces (the side surface on the opposite side of the medium-opposing surface 51) is aligned with the first direction D1.

Figure 13A:
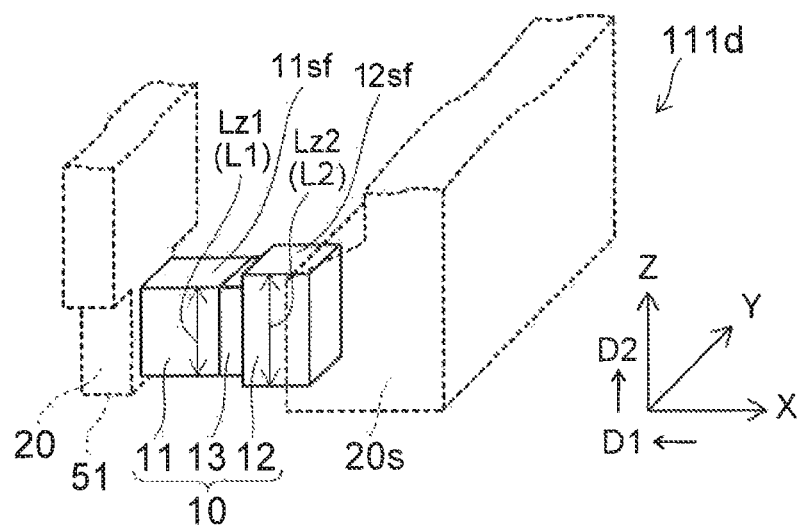
FIG. 13A to FIG. 13C are schematic perspective views illustrating other magnetic recording heads according to the second embodiment.
Figure 13B:
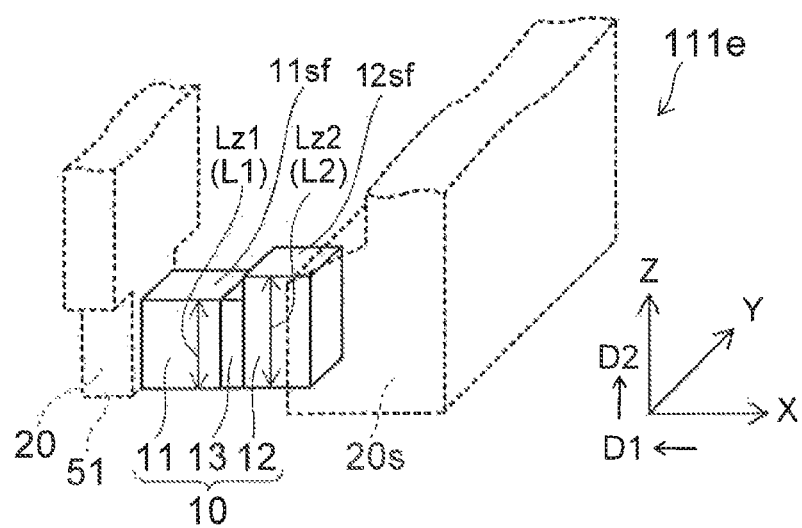
Figure 13C:
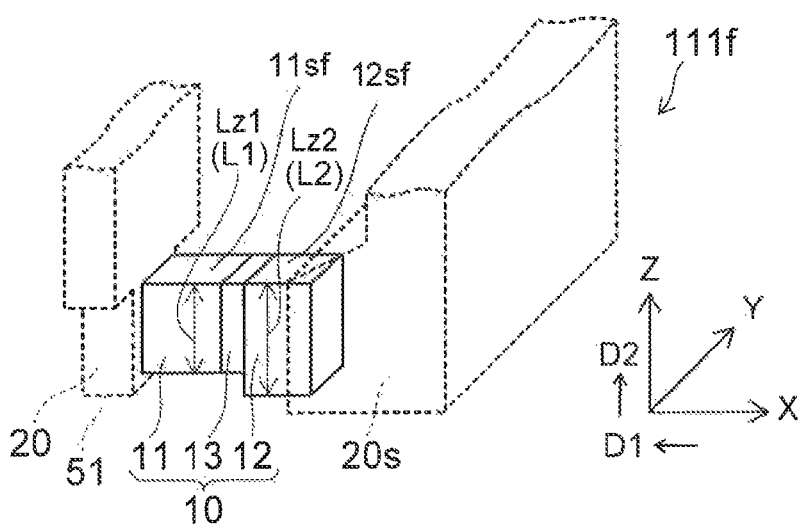

FIG. 13A to FIG. 13C are schematic perspective views illustrating other magnetic recording heads according to the second embodiment.

In magnetic recording heads 111d to 111f as shown in FIG. 13A to FIG. 13C, the length Lz1 (the first length L1) in the Z-direction of the first magnetic layer 11 is shorter than the length Lz2 (the second length L2) in the Z-direction of the second magnetic layer 12. In the magnetic recording heads 111d to 111f, the first length L1 changes discontinuously with the second length L2.

Figure 14A:
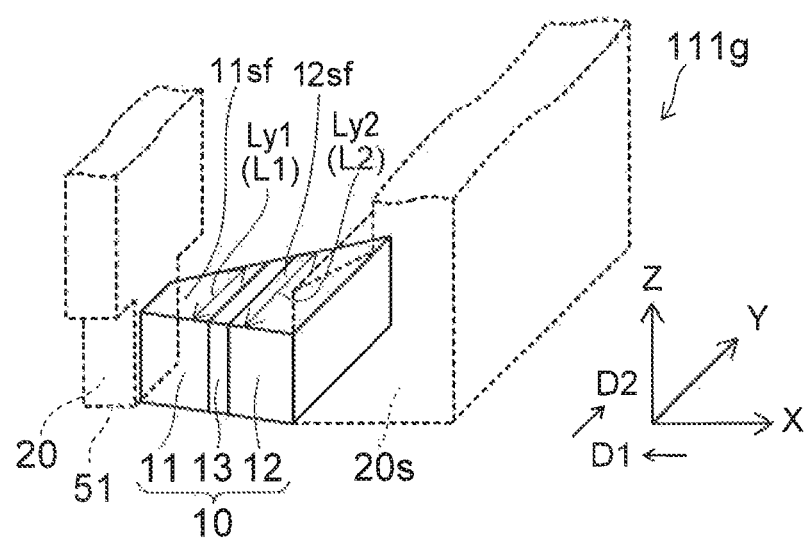
FIG. 14A to FIG. 14C are schematic perspective views illustrating other magnetic recording heads according to the second embodiment.
Figure 14B:
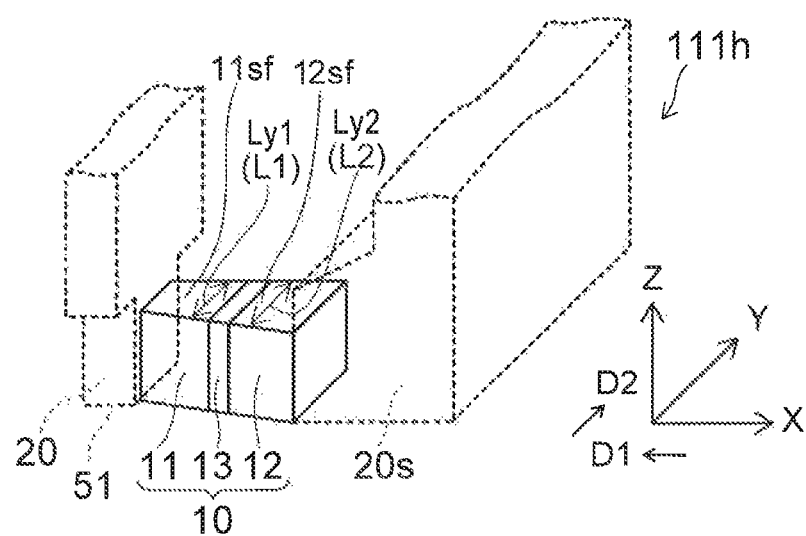
Figure 14C:
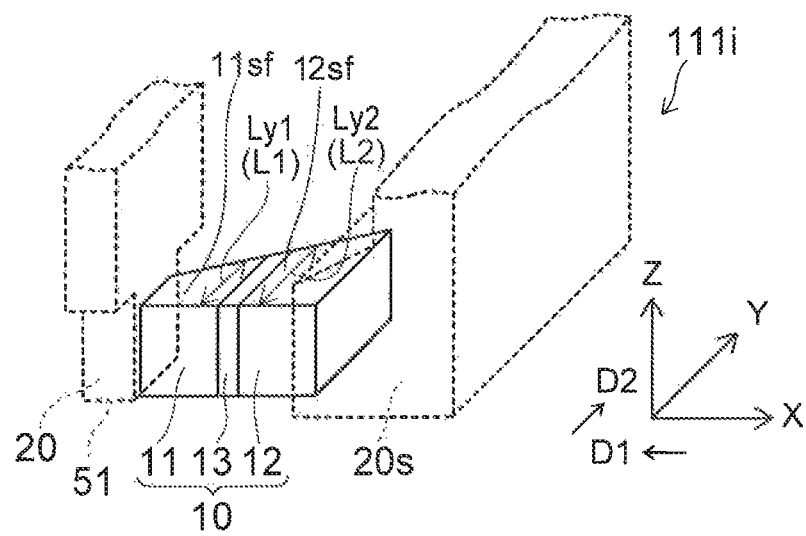

FIG. 14A to FIG. 14C are schematic perspective views illustrating other magnetic recording heads according to the second embodiment.

In magnetic recording heads 111g to 111l as shown in FIG. 14A to FIG. 14C, the length Ly1 (the first length L1) in the Y-direction of the first magnetic layer 11 is shorter than the length Ly2 (the second length L2) in the Y-direction of the second magnetic layer 12. The second direction D2 is aligned with the medium-opposing surface 51.

In the magnetic recording head 111g, the two side surfaces of the first side surface 11sf of the first magnetic layer 11 opposing each other in the Y-direction are tilted with respect to the first direction D1.

In the magnetic recording heads 111h and 111i, one of the two side surfaces of the first side surface 11sf of the first magnetic layer 11 opposing each other in the Y-direction is tilted with respect to the first direction D1. The other one of the two side surfaces is aligned with the first direction D1.

Figure 15A:
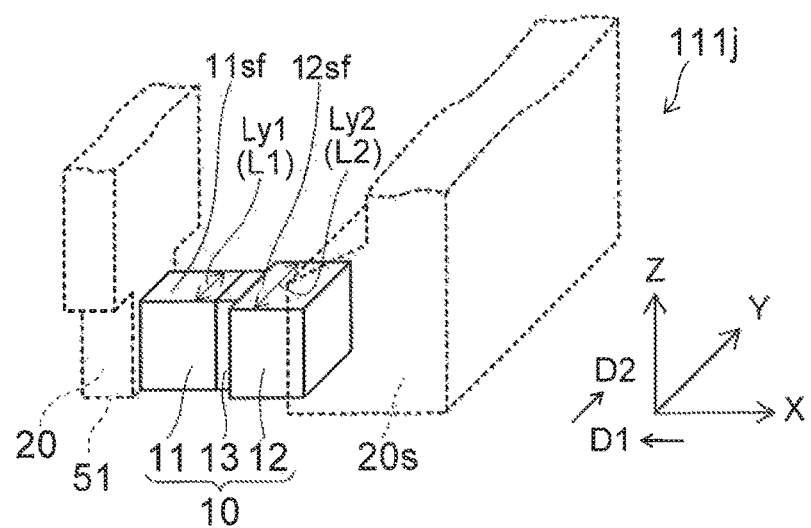
FIG. 15A to FIG. 15C are schematic perspective views illustrating other magnetic recording heads according to the second embodiment.
Figure 15B:
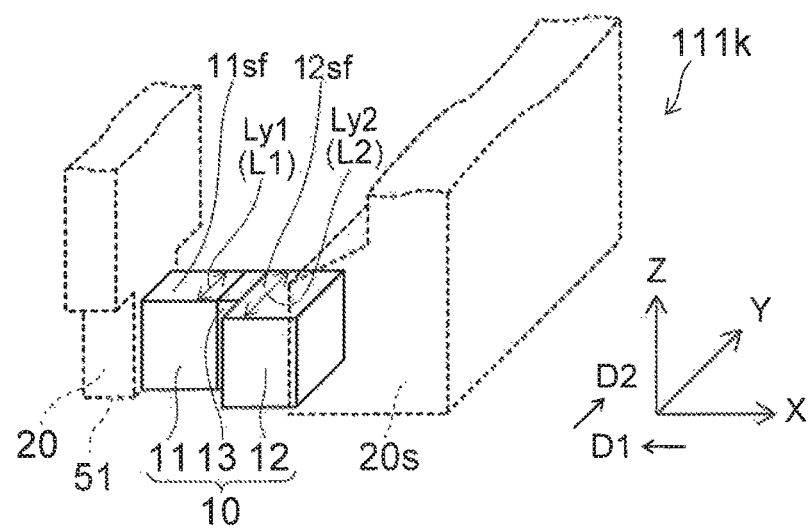
Figure 15C:
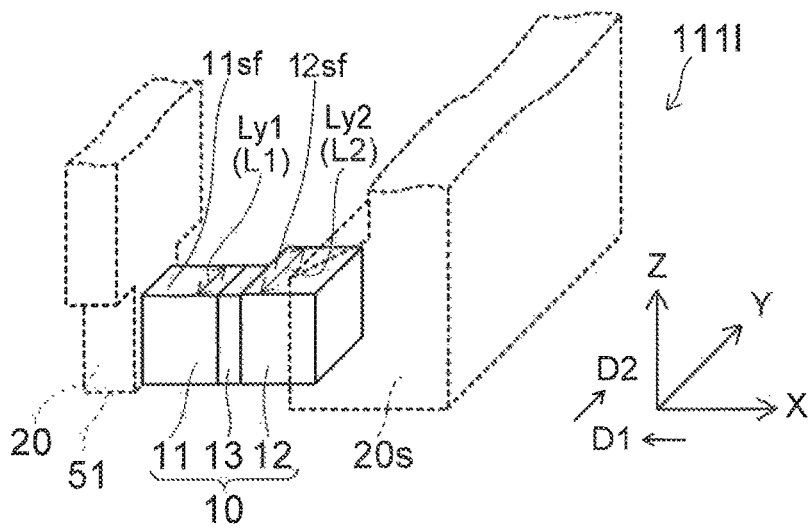

FIG. 15A to FIG. 15C are schematic perspective views illustrating other magnetic recording heads according to the second embodiment.

In magnetic recording heads 111j to 111l as shown in FIG. 15A to FIG. 15C, the length Ly1 (the first length L1) in the Y-direction of the first magnetic layer 11 is shorter than the length Ly2 (the second length L2) in the Y-direction of the second magnetic layer 12. In the magnetic recording heads 111j to 111l, the first length L1 changes discontinuously with the second length L2.

Figure 16A:
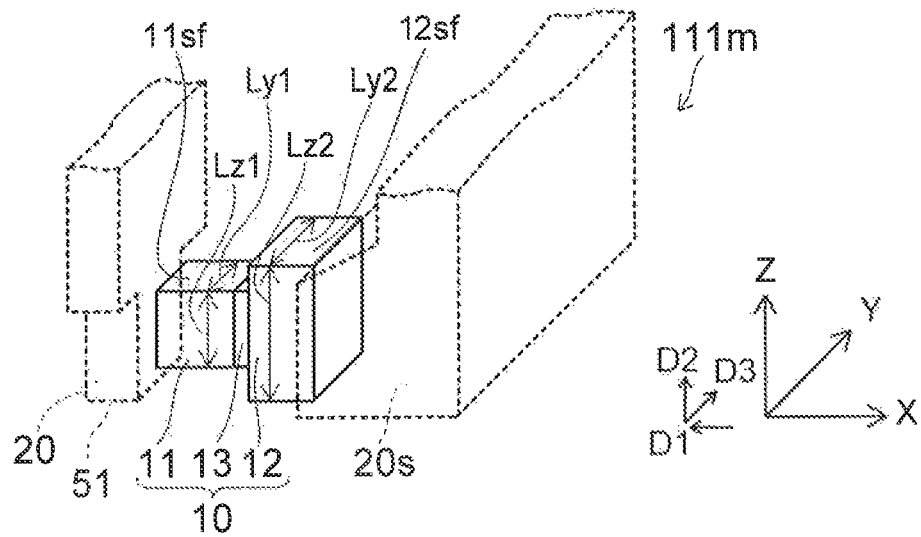
FIG. 16A and FIG. 16B are schematic perspective views illustrating other magnetic recording heads according to the second embodiment.
Figure 16B:
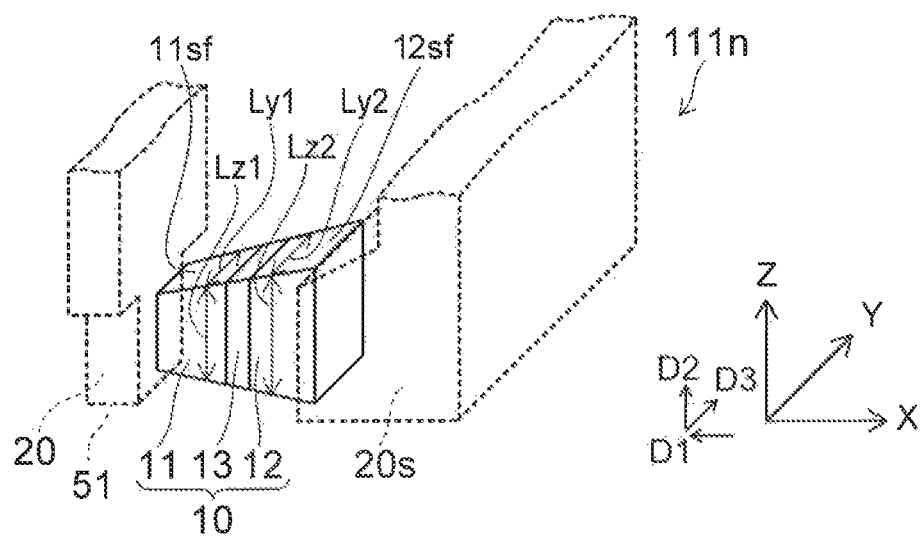

FIG. 16A and FIG. 16B are schematic perspective views Illustrating other magnetic recording heads according to the second embodiment.

In magnetic recording heads 111m and 111n as shown in FIG. 16A and FIG. 16B, the length Lz1 in the Z-direction of the first magnetic layer 11 is shorter than the length Lz2 in the Z-direction of the second magnetic layer 12. The length Ly1 in the Y-direction of the first magnetic layer 11 is shorter than the length Ly2 in the Y-direction of the second magnetic layer 12.

For example, a direction perpendicular to the first direction D1 and crossing the second direction D2 is taken as the third direction D3. In the magnetic recording heads 110m and 110n, the first length L1 of the first magnetic layer 11 in the second direction D2 is shorter than the second length L2 of the second magnetic layer 12 in the second direction D2. The length (the third length L3) of the first magnetic layer 11 in the third direction D3 is shorter than the length (the fourth length L4) of the second magnetic layer 12 in the third direction D3. For example, the second direction D2 crosses the medium-opposing surface 51. The third direction D3 is aligned with the medium-opposing surface 51.

In the magnetic recording head 111m, the first length L1 changes discontinuously with the second length L2. The third length L3 changes discontinuously with the fourth length L4.

In the magnetic recording head 111n, the two side surfaces of the first side surface 11sf of the first magnetic layer 11 opposing each other in the Z-direction are tilted with respect to the first direction D1. The two side surfaces of the first side surface 11sf of the first magnetic layer 11 opposing each other in the Y-direction are tilted with respect to the first direction D1.

Figure 17A:
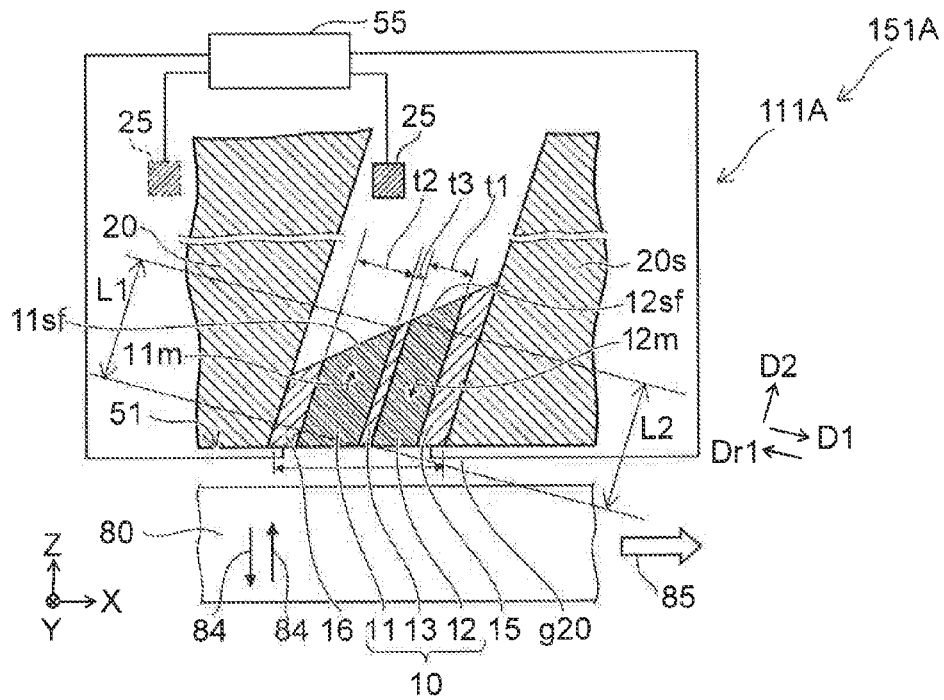
FIG. 17A to FIG. 17C are schematic cross-sectional views illustrating another magnetic recording head and another magnetic recording and reproducing device according to the second embodiment.
Figures 17B, 17C:
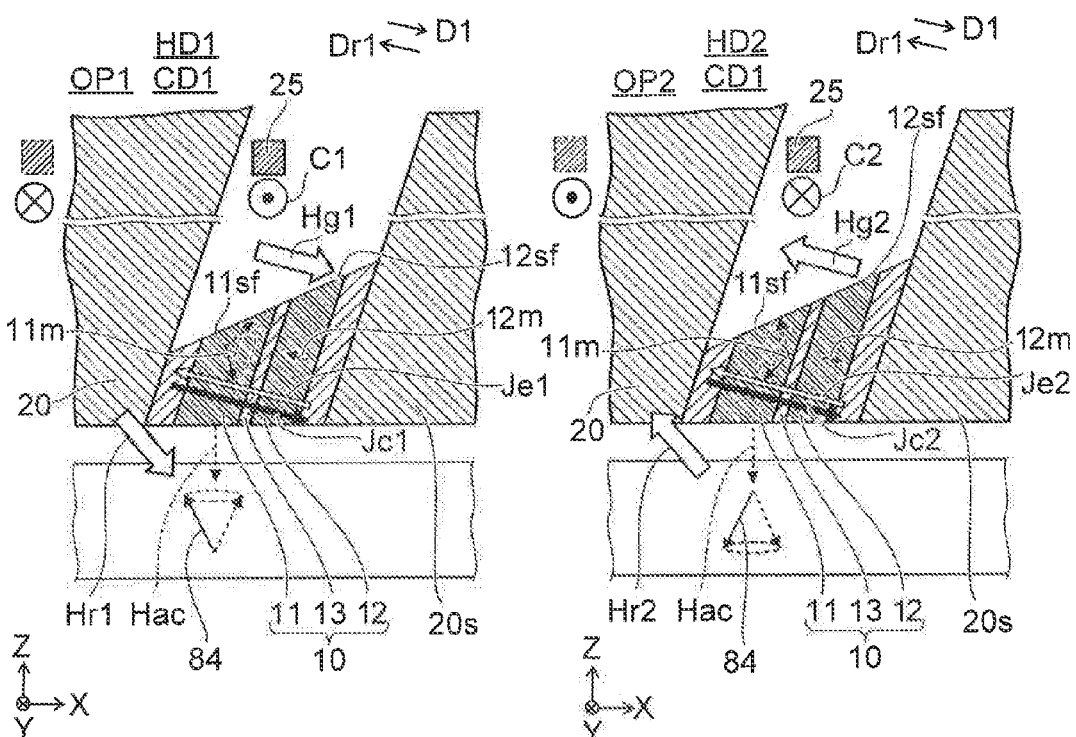

FIG. 17A to FIG. 17C are schematic cross-sectional views illustrating another magnetic recording head and another magnetic recording and reproducing device according to the second embodiment.

FIG. 17B and FIG. 17C illustrate states (operations) of the magnetic recording head and the magnetic recording and reproducing device.

As shown in FIG. 17A, the magnetic recording and reproducing device 151A according to the embodiment includes the magnetic recording medium 80 and the magnetic recording head 111A according to the embodiment. In the embodiment, the stacking direction of the first magnetic layer 11 and the second magnetic layer 12 is tilted with respect to the medium-opposing surface 51. Otherwise, the magnetic recording head 111A is similar to the magnetic recording head 111.

In the magnetic recording head 111A and the magnetic recording and reproducing device 151A as well, the second product of the second thickness t2 and the second saturation magnetic flux density Is larger than the first product of the first thickness t1 and the first saturation magnetic flux density. For example, the first thickness t1 is thinner than the second thickness t2. The first length L1 of the first magnetic layer 11 in the second direction D2 (one direction perpendicular to the first direction D1) is shorter than the second length L2 of the second magnetic layer 12 in the second direction D2.

As shown in FIG. 17B and FIG. 17C, a current (the current Jc1) flows from the second magnetic layer 12 toward the first magnetic layer 11. In the magnetic recording head 111A and the magnetic recording and reproducing device 151A as well, a magnetic recording head and a magnetic recording and reproducing device can be provided in which the recording density can be increased. Low-current driving is possible.

Third Embodiment

A third embodiment relates to a magnetic recording and reproducing device. The magnetic recording and reproducing device according to the embodiment includes the magnetic recording medium 80 and the magnetic recording head of one of the first or second embodiments or modifications of the first or second embodiments. Information is recorded in the magnetic recording medium 80 by the magnetic pole 20. The controller 55 may be further provided.

The controller 55 implements the first operation OP1 and the second operation OP2. In the first operation OP1 and the second operation OP2, the controller 55 supplies the current Jc1 to the stacked body 10.

In the embodiment, the magnetic recording head further includes the coil 25. In the first operation OP1, the controller 55 causes the first magnetic-pole magnetic field Hg1 to be generated from the magnetic pole 20 by supplying the first coil current C1 to the coil 25. In the second operation OP2, the controller 55 causes the second magnetic-pole magnetic field Hg2 to be generated from the magnetic pole 20 by supplying the second coil current C2 to the coil 25.

The case where the magnetic recording head 110 is used will now be described.

Figure 18:
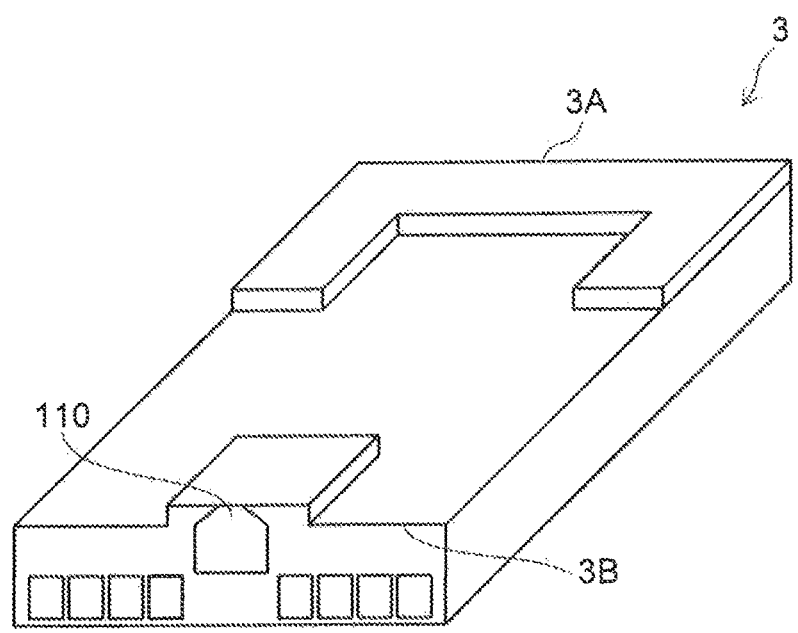
FIG. 18 is a schematic perspective view illustrating a portion of the magnetic recording and reproducing device according to the third embodiment.

FIG. 18 is a schematic perspective view illustrating a portion of the magnetic recording and reproducing device according to the third embodiment.

FIG. 18 illustrates a head slider to which the magnetic recording head is mounted.

The magnetic recording head 110 is mounted to a head slider 3. The head slider 3 includes, for example, Al$_2$O$_3$/TiC, etc. The head slider 3 moves relative to the magnetic recording medium 80 while flying over or contacting the magnetic recording medium 80.

The head slider 3 has, for example, an air inflow side 3A and an air outflow side 3B. The magnetic recording head 110 is disposed at the side surface of the air outflow side 3B of the head slider 3 or the like. Thereby, the magnetic recording head 110 that is mounted to the head slider 3 moves relative to the magnetic recording medium 80 while flying over or contacting the magnetic recording medium 80.

Figure 19:
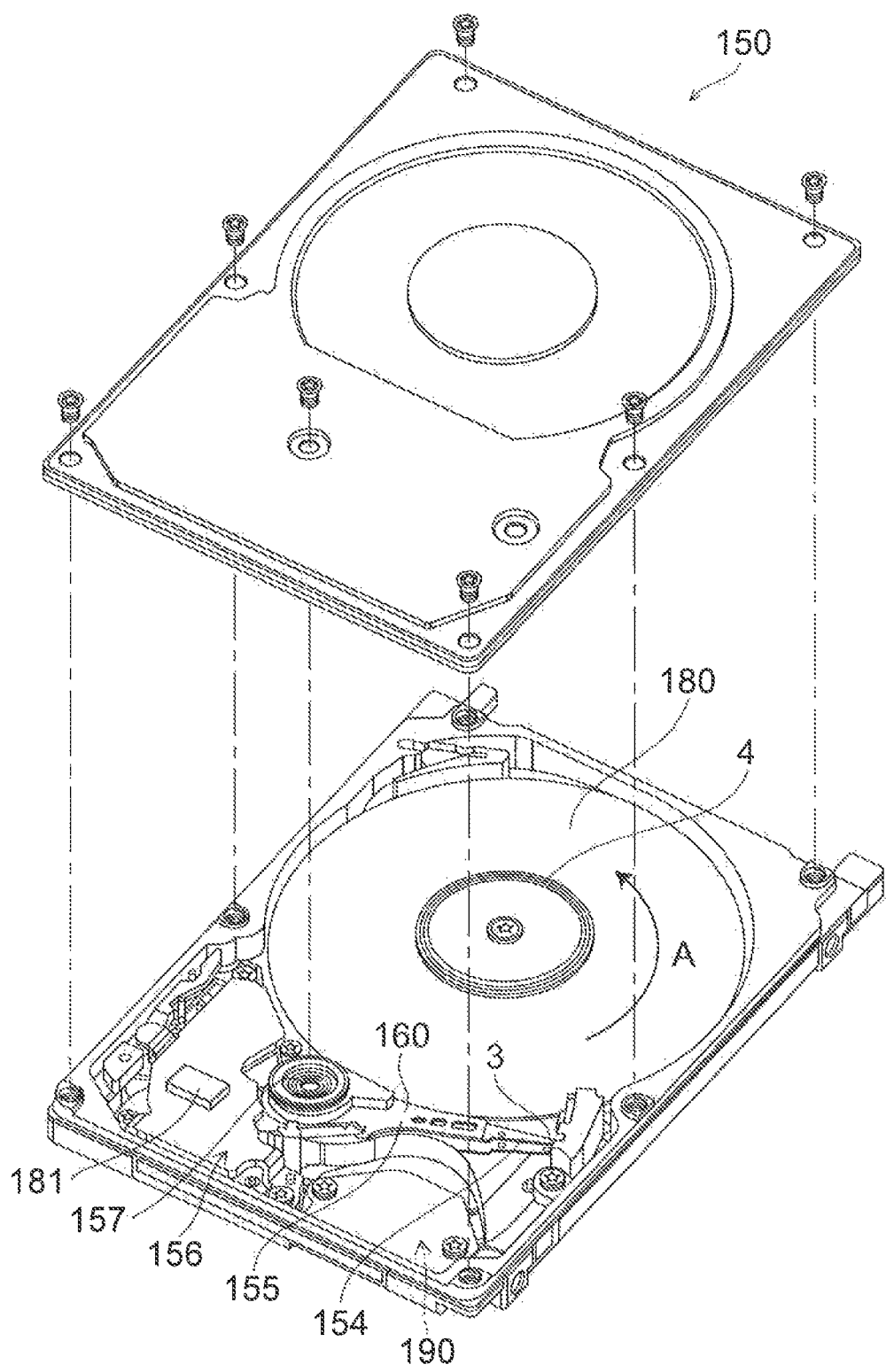
FIG. 19 is a schematic perspective view illustrating the magnetic recording and reproducing device according to the embodiment.

FIG. 19 is a schematic perspective view Illustrating the magnetic recording and reproducing device according to the embodiment.

Figure 20A:
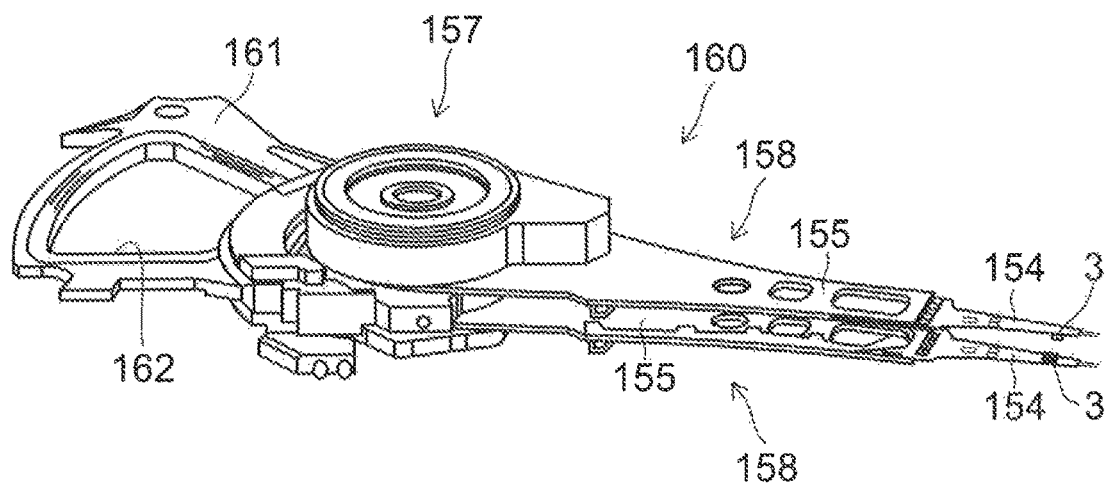
FIG. 20A and FIG. 20B are schematic perspective views illustrating a portion of the magnetic recording and reproducing device.
Figure 20B:
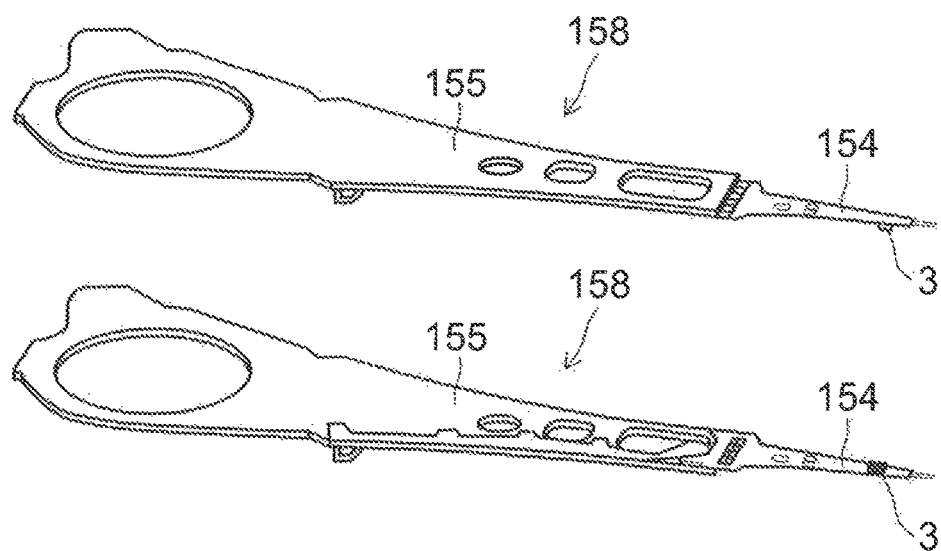

FIG. 20A and FIG. 20B are schematic perspective views Illustrating a portion of the magnetic recording and reproducing device.

As shown in FIG. 19, the magnetic recording and reproducing device 150 according to the embodiment is a device that uses a rotary actuator. A recording medium disk 180 is mounted to a spindle motor 4 and Is rotated in the direction of arrow A by a motor that responds to a control signal from a drive device controller. The magnetic recording and reproducing device 150 according to the embodiment may include multiple recording medium disks 180. The magnetic recording and reproducing device 150 may include a recording medium 181. For example, the magnetic recording and reproducing device 150 is a hybrid HDD (Hard Disk Drive). The recording medium 181 is, for example, a SSD (Solid State Drive). The recording medium 181 includes, for example, nonvolatile memory such as flash memory, etc.

The head slider 3 that performs the recording and reproducing of the information stored in the recording medium disk 180 has a configuration such as that described above and is mounted to the tip of a suspension 154 having a thin-film configuration. Here, for example, one of the magnetic recording heads according to the embodiments described above is mounted at the tip vicinity of the head slider 3.

When the recording medium disk 180 rotates, the medium-opposing surface (the ABS) of the head slider 3 is held at a prescribed fly height from the surface of the recording medium disk 180 by the balance between the downward pressure due to the suspension 154 and the pressure generated by the medium-opposing surface of the head slider 3. A so-called "contact-sliding" head slider 3 that contacts the recording medium disk 180 may be used.

The suspension 154 is connected to one end of an arm 155 (e.g., an actuator arm). The arm 155 includes, for example, a bobbin unit holding a drive coil, etc. A voice coil motor 156 which is one type of linear motor is provided at one other end of the arm 155. The voice coil motor 156 may include a drive coil that is wound onto the bobbin unit of the arm 155, and a magnetic circuit made of a permanent magnet and an opposing yoke that are disposed to oppose each other with the coil interposed. The suspension 154 has one end and one other end; the magnetic recording head is mounted to the one end of the suspension 154; and the arm 155 is connected to the one other end of the suspension 154.

The arm 155 is held by ball bearings provided at two locations on and under a bearing unit 157; and the arm 155 can be caused to rotate and slide unrestrictedly by the voice coil motor 156. As a result, the magnetic recording head is movable to any position of the recording medium disk 180.

FIG. 20A illustrates the configuration of a portion of the magnetic recording and reproducing device and is an enlarged perspective view of a head stack assembly 160.

FIG. 20B is a perspective view illustrating a magnetic recording head assembly (a head gimbal assembly (HGA)) 158 which is a portion of the head stack assembly 160.

As shown in FIG. 20A, the head stack assembly 160 includes the bearing unit 157, the head gimbal assembly 158, and a support frame 161. The head gimbal assembly 158 extends from the bearing unit 157. The support frame 161 extends from the bearing unit 157 in the reverse direction of the HGA. The support frame 161 supports a coil 162 of the voice coil motor.

As shown in FIG. 20B, the head gimbal assembly 158 includes the arm 155 that extends from the bearing unit 157, and the suspension 154 that extends from the arm 155.

The head slider 3 is mounted to the tip of the suspension 154. One of the magnetic recording heads according to the embodiments is mounted to the head slider 3.

In other words, the magnetic recording head assembly (the head gimbal assembly) 158 according to the embodiment includes the magnetic recording head according to the embodiment, the head slider 3 to which the magnetic recording head is mounted, the suspension 154 that has the head slider 3 mounted to one end of the suspension 154, and the arm 155 that is connected to the other end of the suspension 154.

The suspension 154 includes lead wires (not Illustrated) that are for recording and reproducing signals, for a heater that adjusts the fly height, for example, for a spin torque oscillator, etc. The lead wires are electrically connected to electrodes of the magnetic recording head embedded in the head slider 3.

A signal processor 190 that performs recording and reproducing of the signals to and from the magnetic recording medium by using the magnetic recording head also is provided. For example, the signal processor 190 is provided at a portion of the magnetic recording and reproducing device 150 (referring to FIG. 19). The input/output lines of the signal processor 190 are electrically coupled to the magnetic recording head by being connected to electrode pads of the head gimbal assembly 158.

Thus, the magnetic recording and reproducing device 150 according to the embodiment includes a magnetic recording medium, the magnetic recording head according to the embodiment recited above, a movable unit that is relatively movable in a state in which the magnetic recording medium and the magnetic recording head are separated from each other or in contact with each other, a position controller that aligns the magnetic recording head at a prescribed recording position of the magnetic recording medium, and a signal processor that records and reproduces signals to and from the magnetic recording medium by using the magnetic recording head.

In other words, the recording medium disk 180 is used as the magnetic recording medium recited above.

The movable unit recited above may include the head slider 3.

The position controller recited above may include the head gimbal assembly 158.

Thus, the magnetic recording and reproducing device 150 according to the embodiment includes the magnetic recording medium, the magnetic recording head assembly according to the embodiment, and the signal processor that records and reproduces signals to and from the magnetic recording medium by using the magnetic recording head mounted to the magnetic recording head assembly.

Embodiments can include at least one of following features.

(Feature 1) A magnetic recording head, comprising:
 a magnetic pole;
 a stacked body including
 a first magnetic layer,
 a second magnetic layer provided between the first magnetic layer and the magnetic pole, and
 an intermediate layer provided between the first magnetic layer and the second magnetic layer and being nonmagnetic; and
 a first nonmagnetic layer provided between the second magnetic layer and the magnetic pole and contacting the magnetic pole and the second magnetic layer,
 the first magnetic layer having a first thickness and a first saturation magnetic flux density, the first thickness being along a first direction, the first direction being from the second magnetic layer toward the first magnetic layer,
 the second magnetic layer having a second thickness and a second saturation magnetic flux density, the second thickness being along the first direction,
 a second product of the second thickness and the second saturation magnetic flux density being larger than a first product of the first thickness and the first saturation magnetic flux density,
 a first length of the first magnetic layer in a second direction being shorter than a second length of the second magnetic layer in the second direction, the second direction being perpendicular to the first direction,
 a current flowing from the second magnetic layer toward the first magnetic layer.

(Feature 2) A magnetic recording head, comprising:
 a magnetic pole;
 a shield;
 a stacked body including
 a first magnetic layer provided between the magnetic pole and the shield,
 a second magnetic layer provided between the first magnetic layer and the shield, and
 an intermediate layer provided between the first magnetic layer and the second magnetic layer and being nonmagnetic; and
 a first nonmagnetic layer provided between the second magnetic layer and the shield and contacting the shield and the second magnetic layer,
 the first magnetic layer having a first thickness and a first saturation magnetic flux density, the first thickness being along a first direction, the first direction being from the second magnetic layer toward the first magnetic layer,
 the second magnetic layer having a second thickness and a second saturation magnetic flux density, the second thickness being along the first direction,
 a second product of the second thickness and the second saturation magnetic flux density being larger than a first product of the first thickness and the first saturation magnetic flux density,
 a first length of the first magnetic layer in a second direction being shorter than a second length of the second magnetic layer in the second direction, the second direction being perpendicular to the first direction,
 a current flowing from the second magnetic layer toward the first magnetic layer.

(Feature 3) The magnetic recording head according to feature 2, wherein the shield is a trailing shield.

(Feature 4) The magnetic recording head according to one of features 1-3, wherein
 the magnetic pole has a medium-opposing surface, and
 the second direction crosses the medium-opposing surface.

(Feature 5) The magnetic recording head according to one of features 1-3, wherein
 the magnetic pole has a medium-opposing surface, and
 the second direction is aligned with the medium-opposing surface.

(Feature 6) The magnetic recording head according to one of features 1-5, wherein a length of the first magnetic layer in a third direction is shorter than a length of the second magnetic layer in the third direction, the third direction crossing the second direction and being perpendicular to the first direction.

(Feature 7) The magnetic recording head according to one of features 1-6, wherein
 the first magnetic layer has a first side surface crossing the second direction,
 the second magnetic layer has a second side surface crossing the second direction, and
 the second side surface is in a plane including the first side surface.

(Feature 8). The magnetic recording head according to one of features 1-7, wherein
 the first magnetic layer has a first side surface crossing the second direction, and
 the first side surface is tilted with respect to the first direction.

(Feature 9) The magnetic recording head according to one of features 1-8, wherein
 the second magnetic layer has a second side surface crossing the second direction, and
 the second side surface is tilted with respect to the first direction.

(Feature 10) The magnetic recording head according to one of features 1-9, wherein the second length is 1.05 times the first length or more.

(Feature 11) The magnetic recording head according to one of features 1-10, wherein the Intermediate layer includes an oxide.

(Feature 12) The magnetic recording head according to one of features 1 and 2, wherein in a first state, a first magnetic-pole magnetic field is generated from the magnetic pole and has a component along the first direction, In a second state, a second magnetic-pole magnetic field is generated from the magnetic pole and has a component along a first reverse direction, the first reverse direction being from the first magnetic layer toward the second magnetic layer, and in the first state, a magnetization of the first magnetic layer has a component in the first reverse direction.

(Feature 13) The magnetic recording head according to feature 12, wherein a magnetization of the first magnetic layer has a component in the first direction in the second state.

(feature 14) The magnetic recording head according to one of features 12 and 13, wherein the stacked body generates a magnetic wave.

(Feature 15) The magnetic recording head according to feature 14, wherein a frequency of the magnetic wave is not less than 5 gigahertz and not more than 25 gigahertz.

(Feature 16) The magnetic recording head according to one of features 12-15, further comprising a coil, in the first state, the first magnetic-pole magnetic field being generated from the magnetic pole by supplying a first coil current to the coil, in the second state, the second magnetic-pole magnetic field being generated from the magnetic pole by supplying a second coil current to the coil.

(Feature 17) The magnetic recording head according to feature 16, further comprising a controller, the controller supplying the current to the stacked body, in a first operation, the controller supplying the first coil current to the coil while supplying the current to the stacked body, in a second operation, the controller supplying a second coil current to the coil while supplying the current to the stacked body, the second coil current having the reverse orientation of the first coil current.

(Feature 18) A magnetic recording and reproducing device, comprising:
  a magnetic recording head, including:
    a magnetic pole;
    a stacked body including
      a first magnetic layer,
      a second magnetic layer provided between the first magnetic layer and the magnetic pole, and
      an intermediate layer provided between the first magnetic layer and the second magnetic layer and being nonmagnetic; and
    a first nonmagnetic layer provided between the second magnetic layer and the magnetic pole and contacting the magnetic pole and the second magnetic layer,
  the first magnetic layer having a first thickness and a first saturation magnetic flux density, the first thickness being along a first direction, the first direction being from the second magnetic layer toward the first magnetic layer,
  the second magnetic layer having a second thickness and a second saturation magnetic flux density, the second thickness being along the first direction,
  a second product of the second thickness and the second saturation magnetic flux density being larger than a first product of the first thickness and the first saturation magnetic flux density,
  a first length of the first magnetic layer in a second direction being shorter than a second length of the second magnetic layer in the second direction, the second direction being perpendicular to the first direction,
  a current flowing from the second magnetic layer toward the first magnetic layer;
  a magnetic recording medium, information being recorded on the magnetic recording medium by the magnetic head; and
  a controller configured to flow the current in the stacked body.

(Feature 19) The device according to feature 18, wherein
  the magnetic recording head further includes a coil,
  in a first operation, the controller causes the magnetic pole to generate a first magnetic-pole magnetic field having a component along the first direction by supplying a first coil current to the coil, and
  in a second operation, the controller causes the magnetic pole to generate a second magnetic-pole magnetic field having a component along a first reverse direction by supplying a second coil current to the coil, the first reverse direction being from the first magnetic layer toward the second magnetic layer.

(Feature 20) The device according to one of features 18 and 19, wherein the magnetic recording medium is a perpendicular magnetic recording media.

According to the embodiments, a magnetic recording head and a magnetic recording and reproducing device in which the recording density can be increased.

In this specification, "perpendicular" and "parallel" Include not only strictly perpendicular and strictly parallel but also, for example, the fluctuation due to manufacturing processes, etc.; and it Is sufficient to be substantially perpendicular and substantially parallel.

Hereinabove, exemplary embodiments of the invention are described with reference to specific examples. However, the embodiments of the invention are not limited to these specific examples. For example, one skilled in the art may similarly practice the invention by appropriately selecting specific configurations of components Included in the magnetic recording head such as shields, magnetic poles, intermediate layers and insulating layers, and included in the magnetic recording and reproducing devices such as magnetic recording media, etc., from known art. Such practice is included in the scope of the invention to the extent that similar effects thereto are obtained.

Further, any two or more components of the specific examples may be combined within the extent of technical feasibility and are included in the scope of the invention to the extent that the purport of the Invention is included.

Moreover, all magnetic recording heads and magnetic recording and reproducing devices in which the recording density can be increased practicable by an appropriate design modification by one skilled in the art based on the magnetic recording head and magnetic recording and reproducing devices in which the recording density can be increased described above as embodiments of the invention also are within the scope of the invention to the extent that the spirit of the invention is included.

Various other variations and modifications can be conceived by those skilled in the art within the spirit of the invention, and it is understood that such variations and modifications are also encompassed within the scope of the invention.

While certain embodiments have been described, these embodiments have been presented by way of example only, and are not Intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are Intended to cover such forms or modifications as would fall within the scope and spirit of the invention.

What is claimed is:

1. A magnetic recording head, comprising:
a magnetic pole;
a stacked body including
a first magnetic layer,
a second magnetic layer provided between the first magnetic layer and the magnetic pole, and
an intermediate layer provided between the first magnetic layer and the second magnetic layer and being nonmagnetic; and
a first nonmagnetic layer provided between the second magnetic layer and the magnetic pole and contacting the magnetic pole and the second magnetic layer,
the first magnetic layer having a first thickness and a first saturation magnetic flux density, the first thickness being along a first direction, the first direction being from the second magnetic layer toward the first magnetic layer,
the second magnetic layer having a second thickness and a second saturation magnetic flux density, the second thickness being along the first direction,
a second product of the second thickness and the second saturation magnetic flux density being larger than a first product of the first thickness and the first saturation magnetic flux density,
a first length of the first magnetic layer in a second direction being shorter than a second length of the second magnetic layer in the second direction, the second direction being perpendicular to the first direction,
a current flowing from the second magnetic layer toward the first magnetic layer.

2. The head according to claim 1, wherein
the magnetic pole has a medium-opposing surface, and
the second direction crosses the medium-opposing surface.

3. The head according to claim 1, wherein
the magnetic pole has a medium-opposing surface, and
the second direction is aligned with the medium-opposing surface.

4. The head according to claim 1, wherein a length of the first magnetic layer in a third direction is shorter than a length of the second magnetic layer in the third direction, the third direction crossing the second direction and being perpendicular to the first direction.

5. The head according to claim 1, wherein
the first magnetic layer has a first side surface crossing the second direction,
the second magnetic layer has a second side surface crossing the second direction, and
the second side surface is in a plane including the first side surface.

6. The head according to claim 1, wherein
the first magnetic layer has a first side surface crossing the second direction, and
the first side surface is tilted with respect to the first direction.

7. The head according to claim 1, wherein
the second magnetic layer has a second side surface crossing the second direction, and
the second side surface is tilted with respect to the first direction.

8. The head according to claim 1, wherein the second length is 1.05 times the first length or more.

9. The head according to claim 1, wherein the intermediate layer includes an oxide.

10. The head according to claim 1, wherein
in a first state, a first magnetic-pole magnetic field is generated from the magnetic pole and has a component along the first direction,
in a second state, a second magnetic-pole magnetic field is generated from the magnetic pole and has a component along a first reverse direction, the first reverse direction being from the first magnetic layer toward the second magnetic layer, and
in the first state, a magnetization of the first magnetic layer has a component in the first reverse direction.

11. The head according to claim 10, wherein a magnetization of the first magnetic layer has a component in the first direction in the second state.

12. The head according to claim 10, wherein the stacked body generates a magnetic wave.

13. The head according to claim 12, wherein a frequency of the magnetic wave is not less than 5 gigahertz and not more than 25 gigahertz.

14. The head according to claim 10, further comprising a coil,
in the first state, the first magnetic-pole magnetic field being generated from the magnetic pole by supplying a first coil current to the coil,
in the second state, the second magnetic-pole magnetic field being generated from the magnetic pole by supplying a second coil current to the coil.

15. The head according to claim 14, further comprising a controller,
the controller supplying the current to the stacked body,
in a first operation, the controller supplying the first coil current to the coil while supplying the current to the stacked body,
in a second operation, the controller supplying a second coil current to the coil while supplying the current to the stacked body, the second coil current having the reverse orientation of the first coil current.

16. A magnetic recording head, comprising:
a magnetic pole;
a shield;
a stacked body including
a first magnetic layer provided between the magnetic pole and the shield,
a second magnetic layer provided between the first magnetic layer and the shield, and
an intermediate layer provided between the first magnetic layer and the second magnetic layer and being nonmagnetic; and
a first nonmagnetic layer provided between the second magnetic layer and the shield and contacting the shield and the second magnetic layer,
the first magnetic layer having a first thickness and a first saturation magnetic flux density, the first thickness being along a first direction, the first direction being from the second magnetic layer toward the first magnetic layer,
the second magnetic layer having a second thickness and a second saturation magnetic flux density, the second thickness being along the first direction,
a second product of the second thickness and the second saturation magnetic flux density being larger than a first product of the first thickness and the first saturation magnetic flux density, a first length of the first magnetic layer in a second direction being shorter than a second length of the second magnetic layer in the second direction, the second direction being perpendicular to the first direction, a current flowing from the second magnetic layer toward the first magnetic layer.

17. The magnetic recording head according to claim 16, wherein the shield is a trailing shield.

18. A magnetic recording and reproducing device, comprising:
   a magnetic recording head, including:
      a magnetic pole;
      a stacked body including
         a first magnetic layer,
         a second magnetic layer provided between the first magnetic layer and the magnetic pole, and
         an intermediate layer provided between the first magnetic layer and the second magnetic layer and being nonmagnetic; and
      a first nonmagnetic layer provided between the second magnetic layer and the magnetic pole and contacting the magnetic pole and the second magnetic layer,
      the first magnetic layer having a first thickness and a first saturation magnetic flux density, the first thickness being along a first direction, the first direction being from the second magnetic layer toward the first magnetic layer,
      the second magnetic layer having a second thickness and a second saturation magnetic flux density, the second thickness being along the first direction,
      a second product of the second thickness and the second saturation magnetic flux density being larger than a first product of the first thickness and the first saturation magnetic flux density,
      a first length of the first magnetic layer in a second direction being shorter than a second length of the second magnetic layer in the second direction, the second direction being perpendicular to the first direction,
      a current flowing from the second magnetic layer toward the first magnetic layer;
   a magnetic recording medium, information being recorded on the magnetic recording medium by the magnetic head; and
   a controller configured to flow the current in the stacked body.

19. The device according to claim 18, wherein
   the magnetic recording head further includes a coil,
   in a first operation, the controller causes the magnetic pole to generate a first magnetic-pole magnetic field having a component along the first direction by supplying a first coil current to the coil, and
   in a second operation, the controller causes the magnetic pole to generate a second magnetic-pole magnetic field having a component along a first reverse direction by supplying a second coil current to the coil, the first reverse direction being from the first magnetic layer toward the second magnetic layer.

20. The device according to claim 18, wherein the magnetic recording medium is a perpendicular magnetic recording media.

* * * * *